United States Patent
Heo et al.

(10) Patent No.: US 9,125,091 B2
(45) Date of Patent: Sep. 1, 2015

(54) SUPPORTED, SELF-OPTIMIZING WIRELESS NETWORKS, OPTIMIZED WITH RESPECT TO ENERGY, MOBILITY, AND CAPACITY

(71) Applicants: Youn Hyoung Heo, Seoul (KR); Yujian Zhang, Beijing (CN); Huaning Niu, Milpitas, CA (US); Yuan Zhu, Beijing (CN); Debdeep Chatterjee, Santa Clara, CA (US); Jong-Kae Fwu, Sunnyvale, CA (US); Hujun Yin, Saratoga, CA (US)

(72) Inventors: Youn Hyoung Heo, Seoul (KR); Yujian Zhang, Beijing (CN); Huaning Niu, Milpitas, CA (US); Yuan Zhu, Beijing (CN); Debdeep Chatterjee, Santa Clara, CA (US); Jong-Kae Fwu, Sunnyvale, CA (US); Hujun Yin, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 113 days.

(21) Appl. No.: 13/734,380

(22) Filed: Jan. 4, 2013

(65) Prior Publication Data

US 2013/0272132 A1 Oct. 17, 2013

Related U.S. Application Data

(60) Provisional application No. 61/624,185, filed on Apr. 13, 2012.

(51) Int. Cl.
*G01R 31/08* (2006.01)
*H04W 28/08* (2009.01)
(Continued)

(52) U.S. Cl.
CPC ............ *H04W 28/08* (2013.01); *H04L 5/0001* (2013.01); *H04W 24/02* (2013.01); *H04W 28/02* (2013.01);
(Continued)

(58) Field of Classification Search
CPC ... H04W 28/08; H04W 28/02; H04W 72/042; H04W 74/0808; H04W 36/08; H04W 76/023; H04W 24/02; H04W 76/029; H04W 24/10; H04W 36/0016; H04L 5/0001; Y02B 60/50
See application file for complete search history.

(56) References Cited

U.S. PATENT DOCUMENTS

2010/0105395 A1 4/2010 Ji et al.
2010/0311407 A1* 12/2010 Yao et al. ................... 455/422.1
(Continued)

FOREIGN PATENT DOCUMENTS

WO 20130155443 A1 10/2013

OTHER PUBLICATIONS

International Search Report and Written Opinion received for PCT Patent Application No. PCT/US2013/036417 mailed on Aug. 21, 2013, 15 pages.

(Continued)

*Primary Examiner* — Robert Wilson
(74) *Attorney, Agent, or Firm* — Thorpe North & Western LLP

(57) ABSTRACT

Technology is discussed for self-optimization approaches within wireless networks to optimize networks for energy efficiency, load capacity, and/or mobility, together with new, supporting channel state measurements and handover techniques. New, Channel State Information-Reference Signals (CSI-RSs) for yet-to-be-configured Cell-IDentifications (Cell-IDs) can be used to determine whether adjacent transmission cells can provide coverage for transmission cells that can be switched off for energy efficiency during formation of a Single Frequency Network (SFN). New approaches are also discussed to facilitate mobility within such a network. The new CSI-RSs and mobility approaches can also be used to split up such a SFN when changing load demands so require. Additionally, such new approaches can be used to create a SFN with a common Cell-ID where high mobility is required, such as near a roadway, and to break it up where high capacity is required, such as during a period of traffic congestion.

29 Claims, 28 Drawing Sheets

(51) Int. Cl.
- H04W 28/02 (2009.01)
- H04L 5/00 (2006.01)
- H04W 72/04 (2009.01)
- H04W 74/08 (2009.01)
- H04W 36/08 (2009.01)
- H04W 24/02 (2009.01)
- H04W 76/02 (2009.01)
- H04W 24/10 (2009.01)
- H04W 36/00 (2009.01)

(52) U.S. Cl.
CPC .............. *H04W 36/08* (2013.01); *H04W 72/04* (2013.01); *H04W 72/042* (2013.01); *H04W 74/0808* (2013.01); *H04W 76/023* (2013.01); *H04W 24/10* (2013.01); *H04W 36/0016* (2013.01); *H04W 76/028* (2013.01); *Y02B 60/50* (2013.01)

(56) References Cited

U.S. PATENT DOCUMENTS

| | | | |
|---|---|---|---|
| 2011/0171952 A1* | 7/2011 | Niu | 455/422.1 |
| 2012/0020230 A1* | 1/2012 | Chen et al. | 370/252 |
| 2013/0155936 A1* | 6/2013 | Deng et al. | 370/312 |
| 2013/0203419 A1* | 8/2013 | Siomina et al. | 455/437 |
| 2013/0272132 A1* | 10/2013 | Heo et al. | 370/236.2 |
| 2013/0315197 A1* | 11/2013 | Park et al. | 370/329 |

OTHER PUBLICATIONS

Lee, et al, Coordinated Multipoint Transmission and Reception in LTE-Advanced: Deployment Scenarios and Operational Challenges, IEEE Communication Magazine, vol. 50, No. 2, pp. 148-155.

R1-110426, Some considerations on CoMP deployment scenarios, 3 GPP TSG-RAN WGI #63bis, published Jan. 21, 2011.

Zhang, et al, A Two-Layer Mobility Load Balancing in LTE Self-Organization Networks, Proceeding of IEEE International Conference on Communication Technology (ICCT), published Sep. 28, 2011 pp. 925-929.

* cited by examiner

```
-- ASN1START

CSI-RS-EnergyEff-Config-r12 ::=    SEQUENCE {
    csi-RS-EnergyEff-r12           CHOICE {
        release                    NULL,
        setup-1                    SEQUENCE {
            antennaPortsCount-r12      ENUMERATED {an1, an2, an4, an8},
            resourceConfig-r12         INTEGER (0..31),
            subframeConfig-r12         INTEGER (0..154),
            cinitConfig-r12            INTEGER (0..503)
        }
        setup-2                    SEQUENCE {
            antennaPortsCount-r12      ENUMERATED {an1, an2, an4, an8},
            resourceConfig-r12         INTEGER (0..31),
            subframeConfig-r12         INTEGER (0..154),
            cinitConfig-r12            INTEGER (0..503)
        }
        ...
        setup-N                    SEQUENCE {
            antennaPortsCount-r12      ENUMERATED {an1, an2, an4, an8},
            resourceConfig-r12         INTEGER (0..31),
            subframeConfig-r12         INTEGER (0..154),
            cinitConfig-r12            INTEGER (0..503)
        }

}                                                      OPTIONAL,   -- Need ON
    zeroTxPowerCSI-RS-r12      CHOICE {
        release                    NULL,
        setup-1                    SEQUENCE {
            zeroTxPowerResourceConfigList-r12    BIT STRING (SIZE (16)),
            zeroTxPowerSubframeConfig-r12        INTEGER (0..154)
        }
        setup-2                    SEQUENCE {
            zeroTxPowerResourceConfigList-r12    BIT STRING (SIZE (16)),
            zeroTxPowerSubframeConfig-r12        INTEGER (0..154)
        }
        ...
        setup-N                    SEQUENCE {
            zeroTxPowerResourceConfigList-r12    BIT STRING (SIZE (16)),
            zeroTxPowerSubframeConfig-r12        INTEGER (0..154)
        }
    }                                                      OPTIONAL    -- Need ON
}

-- ASN1STOP
```

FIG. 6

```
-- ASN1START

CSI-RS-MobMgmt-Config-r12 ::=    SEQUENCE {
    csi-RS-MobMgmt-r12              CHOICE {
        release                         NULL,
        setup-cell1                     SEQUENCE {
            antennaPortsCount-r12           ENUMERATED {an1, an2, an4, an8},
            resourceConfig-r12              INTEGER (0..31),
            subframeConfig-r12              INTEGER (0..154),
            p-C-r12                         INTEGER (-8..15)
        }
        setup-cell2                     SEQUENCE {
            antennaPortsCount-r12           ENUMERATED {an1, an2, an4, an8},
            resourceConfig-r12              INTEGER (0..31),
            subframeConfig-r12              INTEGER (0..154),
            p-C-r12                         INTEGER (-8..15)
        }
        ...
        setup-cellN                     SEQUENCE {
            antennaPortsCount-r12           ENUMERATED {an1, an2, an4, an8},
            resourceConfig-r12              INTEGER (0..31),
            subframeConfig-r12              INTEGER (0..154),
            p-C-r12                         INTEGER (-8..15)
        }

}                                                                OPTIONAL,        -- Need ON
    zeroTxPowerCSI-RS-r12           CHOICE {
        release                         NULL,
        setup-cell1                     SEQUENCE {
            zeroTxPowerResourceConfigList-r12    BIT STRING (SIZE (16)),
            zeroTxPowerSubframeConfig-r12        INTEGER (0..154)
        }
        setup-cell2                     SEQUENCE {
            zeroTxPowerResourceConfigList-r12    BIT STRING (SIZE (16)),
            zeroTxPowerSubframeConfig-r12        INTEGER (0..154)
        }
        ...
        setup-cellN                     SEQUENCE {
            zeroTxPowerResourceConfigList-r12    BIT STRING (SIZE (16)),
            zeroTxPowerSubframeConfig-r12        INTEGER (0..154)
        }
    }                                                                OPTIONAL         -- Need ON
}

-- ASN1STOP
```

FIG. 15

SUPPORTED, SELF-OPTIMIZING WIRELESS NETWORKS, OPTIMIZED WITH RESPECT TO ENERGY, MOBILITY, AND CAPACITY

RELATED APPLICATIONS

This application claims the benefit of and hereby incorporates by reference U.S. Provisional Patent Application Ser. No. 61/624,185, filed Apr. 13, 2012.

BACKGROUND

To improve performance with respect to different parameters, wireless networks can self-optimize. A wireless network can be optimized by making changes at transmission cells within a wireless network. In a self-optimizing network, these changes can be determined and implemented by the network itself.

Self-optimization approaches are currently applied within wireless networks in a limited number of ways with respect to a limited number of parameters. Due to the limited ways in which self-optimizing networks have been applied, a potential exists to improve wireless networks in different ways through self-optimization. The ways in which such improvements can be achieved remain to be discovered. However, several difficulties can arise with respect to the implementation of a self-optimization approach even once an application is discovered.

Self-optimization within a wireless network involves changes within the wireless network. These changes rely on supporting infrastructure to allow the changing network to continue to perform its function. In particular, a wireless network still needs infrastructure to provide services to mobile communication devices within the network despite the changes taking place at transmission cells therein. Limitations in supporting infrastructure can prevent the flexibility with which wireless networks can self-optimize.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 6 depicts Abstract Syntax Notation 1 (ASN1) source code that can be used to generate CSI-RSs for yet-to-be configured PCIs/Cell_IDs;

FIG. 15 is a block diagram illustrating ASN1 source code that can be used to generate CSI-RSs for yet-to-be-configured PCIs/Cell-IDs for measurements with which redistributions of load traffic can be accommodated;

Figure 1A:
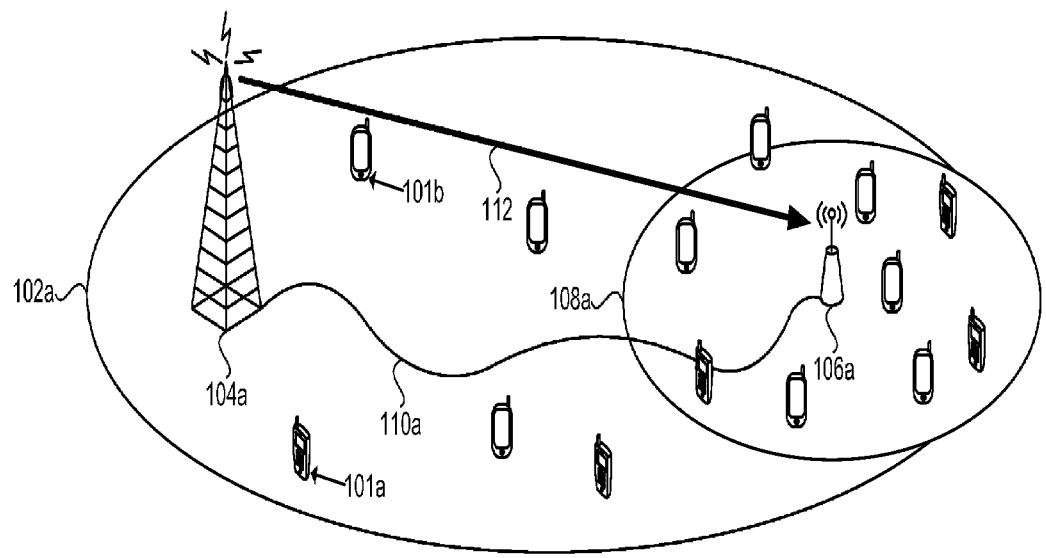
FIG. 1A is a block diagram illustrating a Macro evolved Node B (eNodeB) communicatively coupled with an active capacity booster capable of self-optimization.

Reference will now be made to the exemplary examples illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting.

DEFINITIONS

As an important statement of the generality of examples discussed in this disclosure, while the terminology of the Third Generation Partnership Project (3GPP) Long Term Evolution (LTE) standard is often used throughout this specification, it is not intended to be limiting, and there are exceptions in the use of more general terminology in portions of this specification to further communicate this point.

Different terminology for wireless mobile devices is used in different specifications. As used herein, a wireless mobile device can be a User Equipment (UE) or a Mobile Station (MS), among other possibilities. Throughout this application, the terms wireless mobile device, UE, and MS can be used interchangeably.

As used herein the term "transmission node" is defined as a wireless communication device in a Wireless Wide Area Network (WWAN) configured to communicate with a plurality of wireless mobile devices located within a geographic region referred to as a cell. Different terminologies for transmission nodes are used in different specifications. Terminology used for different variations of a transmission node can include, but are not limited to, a Base Station (BS), an evolved Node B (eNodeB or eNB), a WWAN transmission node, a transmission node, a wireless transmission node, and a WWAN node. The terms are used interchangeably, unless otherwise noted. The actual definition of a BS or eNodeB is provided in their Institute of Electronics and Electrical Engineers (IEEE) 802.16 and the 3GPP specifications.

As used herein the term "transmission cell" refers to any entity to which a Physical Cell Identifier (PCIs) or Cell-IDentifications (Cell-IDs) can be assigned. Throughout the specification, the terms Cell-ID and PCI can be used interchangeably. For example, a transmission cell can refer to a single transmission node. As multiple PCIs/Cell-IDs can be assigned to multiple different Component Carriers (CCs) corresponding to different spans of the frequency spectrum, a single transmission node can have multiple transmission cells. Additionally, a transmission cell can refer to multiple transmission nodes and/or CCs assigned a common PCIs/Cell-ID, even where CCs pertain to different transmission nodes. As used throughout this application, "transmission node/cell" can refer to a transmission node, a transmission cell, or both.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

EXAMPLE EXAMPLES

An initial overview of technology examples is provided below and then specific technology examples are described in further detail later. This initial summary is intended to aid readers in understanding the technology more quickly but is not intended to identify key features or essential features of the technology, nor is it intended to limit the scope of the claimed subject matter.

Multiple exemplary examples can be implemented on an evolved Node B (eNodeB) and/or an Operation & Maintenance (O&M) module located within a Core Network (CN), such as an Evolved Packet Core (EPC). In certain examples directed to optimization of energy efficiency, load information can be acquired for a set of transmission nodes/cells within a selected coverage area. A reduced set of these transmission nodes/cells can then be selected as capable of providing coverage to the selected coverage area. The reduced set can be selected based on measurements from Channel State Information-Reference Signals (CSI-RSs) that can be indexed to yet-to-be-configured Physical Cell Identifiers (PCIs)/Cell-IDentifications (Cell-IDs) sent to a plurality of UEs within the selected coverage area.

These CSI-RSs indexed to yet-to-be-configured PCIs/Cell-IDs can be embedded with identification information. The identification information can allow a measurement of the CSI-RSs, as performed by UEs to which the CSI-RSs are broadcast, to be indexed to yet-to-be-configured PCIs/Cell- IDs and to be identified with the individual transmission nodes/cells transmitting them. This identification can be made even despite the transmission nodes/cells in the selected coverage area sharing a common Cell-IDentification (Cell-ID). Such measurements can be used to select the reduced set of transmission nodes/cells by indicating adjacent transmission nodes/cells that can transmit and receive with sufficient strength to and from UEs within the coverage area of a transmission node/cell experiencing a relatively low load.

Transmission nodes/cells with such low loads, whose coverage areas can be covered by adjacent transmission nodes/cells can be left off the reduced set of transmission nodes/cells that will maintain coverage for the selected coverage area. Transmission nodes/cells on the reduced set of transmission nodes can be reconfigured into a Single Frequency Network (SFN) with a common Cell-ID. Because the measurements can be indexed to yet-to-be-configured PCIs/Cell-IDs, the selected coverage area can be insured to receive coverage with fewer transmission nodes/cells.

Several approaches can be used to handover UEs and/or reconfigure UEs with new PCIs/Cell-IDs in the selected coverage area. For example, a reconfiguration message can be sent to a plurality of UEs associated with the set of transmission nodes/cells. The reconfiguration message, which can comprise an indication for the plurality of UEs to stop transmission, a value of the new PCI/Cell-ID, and/or a corresponding time when the new PCI/Cell-ID will be operational, can be sent to allow the UEs to connect to a set of transmission nodes/cells when the set of transmission nodes/cells are reconfigured with the new PCI/Cell-ID. The reconfiguration message can be embedded in a value tag and/or a paging message. As another example, the reconfiguration message can comprise a common handover command message sent to the plurality of UEs via multicast signaling. The common handover command can provide parameters, such as one or more Cell Radio Network Temporary Identifiers (C-RNTIs), one or more target transmission node/cell security algorithm identifiers, information for a dedicated Random Access CHannel (RACH), and/or target eNodeB system information, that can be used to perform a handover for the plurality of UEs to the reconfigured set of transmission nodes/cells with the new PCI/Cell-ID.

In some examples, after the formation of an SFN with a common Cell-ID, it can be determined that one or more additional transmission nodes/cells would improve handling of traffic load increases within the selected coverage area. Additional CSI-RSs for yet-to-be-configured PCIs/Cell-IDs can be generated and sent, as discussed above. The corresponding measurements can be used to reconfigure one or more additional transmission nodes/cells with one or more new PCIsCell-IDs. Handover and/or reconfiguration of UEs to transmission nodes/cells with one or more new PCIs/Cell-IDs can also be facilitated by handover and/or reconfiguration of UE PCI/Cell-ID methods along the lines discussed with respect to the preceding examples.

The preceding examples of CSI-RS generation for yet-to-be-configured PCIs/Cell-IDs and UE handover and PCI/Cell-ID reconfiguration can also facilitate the Self-Optimization of Networks (SONs) to adapt to changing demands for high mobility and load capacity. For example, load capacity can be a primary concern along a highway during periods of high traffic congestion with multiple users traveling at relatively low speeds, resulting in high volumes of data with few handovers occurring between cells. However, during periods of low traffic, the number of users can be greatly reduced, by users traveling through an area at a relatively high speed. The higher speed travel during periods of low traffic results in a fairly low amount of data at each cell, but with a much greater number of handovers relative to the high traffic congestion example. Depending on the volume of a traffic load in such an area and/or the speed of UEs therein, one of a high mobility Cell-ID configuration and a high load capacity Cell-ID configuration can be selected.

When high mobility is the priority, a set of transmission nodes/cells in the area can be configured within an SFN and a common PCI/Cell-ID using new handover procedures discussed above. The SFN with the common PCI/Cell-ID can significantly reduce the number of handovers that occur for users traveling at highway speeds. With the SFN and the common PCI/Cell-ID, the mobility overhead is greatly reduced to achieve high mobility. When high capacity is called for, multiple transmission nodes/cells with different PCIs/cell-IDs can be implemented. These multiple transmission nodes/cells with different PCIs/cell-IDs can adjust to increased loads with greater spectral efficiency. The transmission from fewer to more PCIs/Cell-IDs can be facilitated with the CSI-RSs for yet-to-be-configured PCIs/Cell-IDs and approaches to handover discussed above. Additional details for several exemplary examples are now provided below with the aid of the following figures.

FIG. 1A illustrates multiple UEs, of which UEs 101a, 101b provide examples of various sorts of UEs, in a portion 102a of a SON covered by a basic coverage eNodeB 104a. In certain examples, the basic coverage eNodeB can be a MaCro-Node (MCN) eNodeB. Also within the portion 102a, is a capacity booster 106a with a booster coverage area 108a. As depicted, the booster coverage area 108a may extend out of the portion 102a covered by the basic coverage eNodeB 104a to areas covered by other transmission nodes/cells within a self-optimizing network. In one embodiment, a capacity booster can be distinguished from a basic coverage eNodeB because the capacity booster can only improve coverage or provide increased capacity, without being necessary for basic coverage when cell traffic is at reduced levels that can be provided by the MCN alone.

The capacity booster 106a can be a Low Power Node (LPN). An LPN can comprise one of a micro cell, a pico cell, a femto cell, a home eNodeB cell (HeNB), a Remote Radio Head (RRH), a Remote Radio Equipment (RRE), a repeater, or another type of transmission node having a lower power than is typically used at an MCN eNodeB. The basic coverage eNodeB 102a and the capacity booster 106a can be communicatively coupled over a backhaul link 110a. The backhaul link is typically formed using a wired or optical connection. Communication over the backhaul link can be accomplished using an interface, such as, by way of example and not limitation, an X2 interface.

As depicted in FIG. 1A, several UEs reside within the booster coverage area 108a. The basic coverage eNodeB 102a can, therefore, turn on the capacity booster 106a, as depicted in FIG. 1A, to increase capacity and maintain/improve a quality of service for the UEs in the booster coverage area. However, transmissions from the capacity booster can be energy intensive and can be unnecessary at times.

Figure 1B:
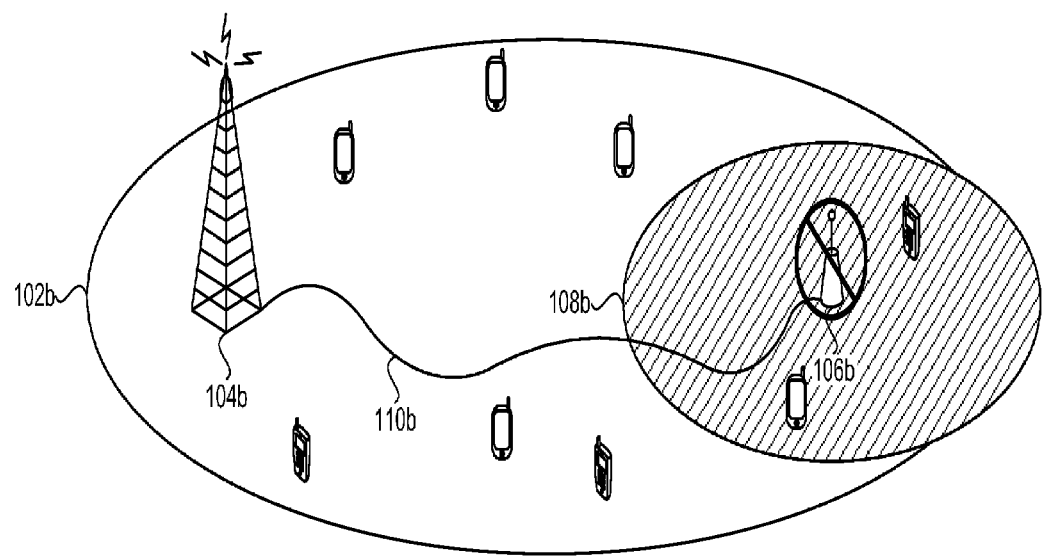
FIG. 1B is a block diagram illustrating a Macro eNodeB (MCN) communicatively coupled with an in-active capacity booster capable of self-optimization.

FIG. 1B illustrates the same portion 102b of the self-optimizing network covered by the same basic coverage eNodeB 104b in communication, over the same backhaul link 110a, with the same capacity booster 106a, with the same booster coverage area 108a. However, at the time, or in the scenario, depicted in FIG. 1B, only two UEs 101a, 101b remain within the booster coverage area 108b. Therefore, to promote energy savings and reduce operational expenses related thereto, the capacity booster can be switched off, to a dormant state, in as much as its capacity is no longer needed. The cross-hatched booster coverage area in FIG. 1B indicates that the capacity booster has been switched off.

The decision to switch-off the capacity booster 106b, or to reactivate the capacity booster 106b, can be taken autonomously by the basic coverage eNodeB, or an O&M module located within a CN, such as an EPC, on an as-needed basis. The decision can be based on load information for various transmission nodes/cells in the SON and general configuration information for the SON. The basic coverage eNodeB can initiate handover actions to off-load the capacity booster being switched off and can provide a cause value to the target eNodeB indicating the reason for handover to facilitate potential subsequent handovers.

As contextual information for the discussion that follows, although depictions are made in FIG. 1 through FIG. 16 that focus on transmission nodes with a single transmission cell, depictions in FIG. 17 through FIG. 21 are consistent with transmission nodes with one or more transmission cells, which could arise from a transmission node with multiple Component Carriers (CCs). The focus on transmission nodes in depictions are made in FIG. 1 through FIG. 16 is done for simplicity of explanation. However, the concepts discussed with respect to these figures are equally applicable to all types of transmission cells. This point is further communicated by the random use of the term transmission node/cell and the depictions in FIG. 17 through FIG. 21.

Figure 2:
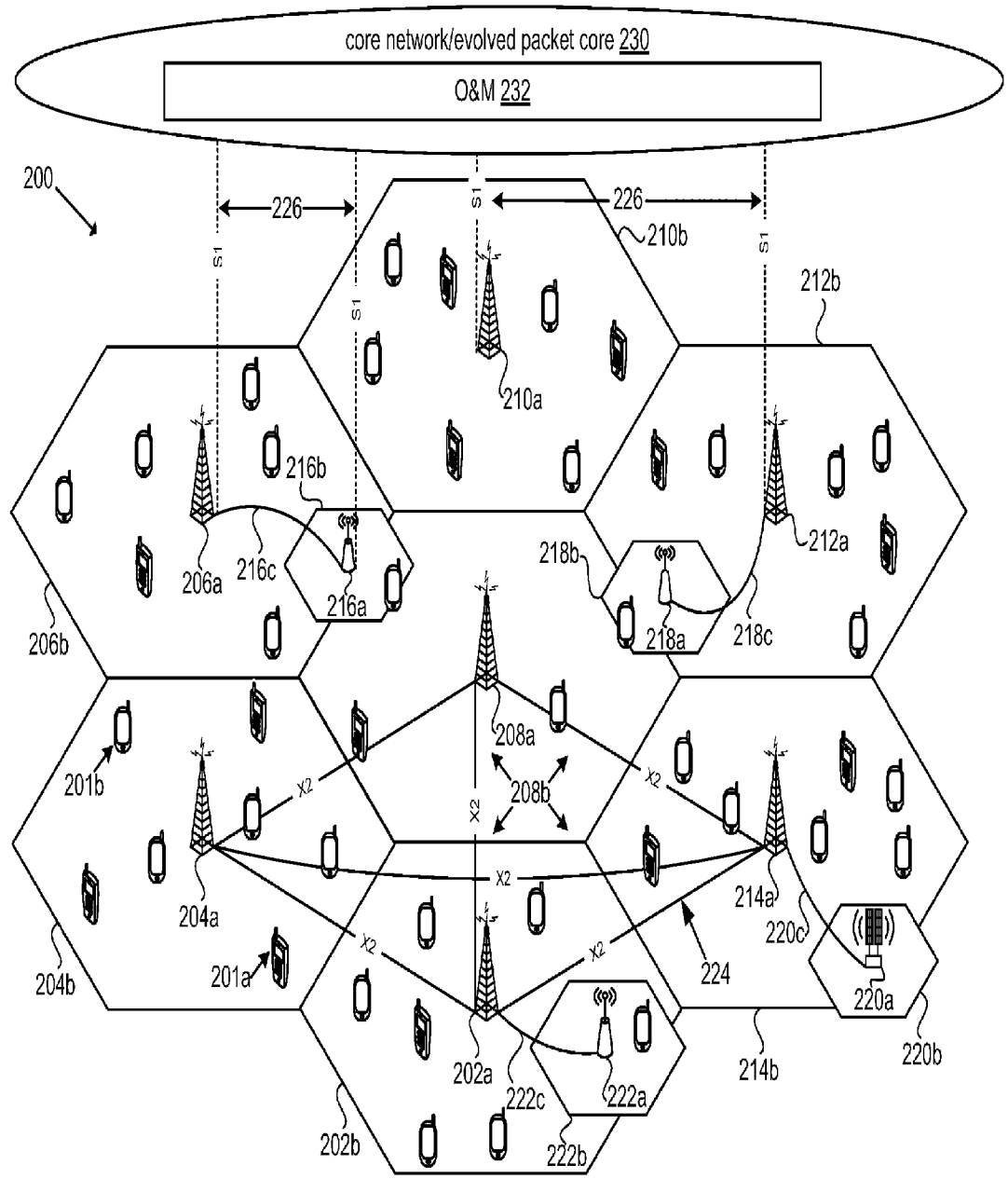
FIG. 2 is a block diagram illustrating communication infrastructure between eNodeBs and communication infrastructure between eNodeBs and an Evolved Packet Core (EPC) that can be used to report traffic loads to determine changes for self-optimization.

FIG. 2 depicts communication infrastructure between eNodeBs 202a-222a and communication infrastructure between eNodeBs and a CN 230, such as an EPC, within a selected coverage area at a first period of time 200. (The same coverage area will later be depicted at a second period of time 1400 in FIG. 14.) The O&M module 232 is depicted as residing in the CN. The various eNodeBs can be classified as basic coverage nodes 202a-214a and non-basic coverage nodes 216a-222a. The non-basic coverage nodes can be, but need not necessarily be, capacity boosters 106a, 106b. They can also be different forms of LPNs, as illustrated by the depiction of non-basic coverage node 220a as an RRH. Although in some examples, non-basic coverage nodes can be MCNs, this is not true for examples in which they are treated as capacity boosters as described in Section 2.4.4 of Technical Specification (TS) 36.300 of Releases 8 through 10 of the Long Term Evolution (LTE) standard promulgated by the 3GPP. Additionally, the non-basic coverage nodes can be, but need not necessarily be, communicatively coupled to given basic coverage nodes 202a, 206a, 212a, and 214a over capacity-extending backhaul links 216a-222a, such as, but not necessarily, X2 interfaces.

Although the selected coverage area 200 comprises eleven transmission nodes in FIG. 2, as can be appreciated, larger and smaller selected coverage areas are consistent with the present invention. The selected coverage area can make up a SON, or only a portion thereof. In certain examples, the selected coverage area can be determined by the O&M module 232 and/or a network operator based on traffic patterns within a given area.

Although basic coverage nodes 202a-214a can typically be MCN eNodeBs, as depicted in FIG. 2, they may also be LPNs, depending on relevant standards. Each eNodeB 202a-222a has a corresponding coverage area 202b-222b within the overall selected coverage area 200. Within the selected coverage area, multiple UEs 101a, 101b are located.

A lattice of backhaul communication links 224 is depicted in FIG. 2 over which basic coverage nodes 202a, 204a, 208a, 214a can communicate with one another. For purposes of illustration, the lattice of backhaul links is only depicted for a subset 202a, 204a, 208a, 214a of the basic coverage nodes 202a-214a. However, similar backhaul communication links can extend to the remaining basic coverage nodes 206a, 210a, 212a, and even non-basic coverage nodes 216a-222a. The backhaul communication links 224 can, but need not necessarily, comprise X2 communication links. The backhaul communication links 224 can extend between each eNodeB in the selected coverage area 200, or communications can be relayed between eNodeBs along a path where no direct communication link is available.

Also depicted are CN communication links 226, by which eNodeBs 202a-222a can communicate with the CN 230. Such CN communication links can provide direct communication between an eNodeB and the CN. Such direct CN communication links to the CN can be established between basic coverage nodes 202a-214a, non-basic coverage nodes 216a/222a, MCNs and/or LPNs. Although a subset of eNodeBs 206a, 216a, 210a, and 212a are shown with CN communication links, for purposes of illustration, any of the eNodeBs can have a CN communication link. Alternatively, eNodeBs without a direct CN communication link can communicate with the CN indirectly, by relay over backhaul communication links 224 and/or capacity-extending backhaul links 216c-222c, through certain eNodeBs 206a, 216a, 210a, 212a with CN communication links. Information communicated to the CN can be communicated to the O&M module 232 residing therein.

The capacity-extending backhaul links 216c-222c can, but need not necessarily, be used as the backhaul link 110a depicted in FIG. 1A and FIG. 1B, to communicate autonomous decisions from a basic coverage eNodeBs (202a, 206a, 212a, and 214a) and/or the O&M module 232 to switch on or off the non-basic coverage eNodeBs 216a-222a. Additionally, peer eNodeBs can be informed of a decision by a basic coverage eNodeB, for example eNodeB 212a, to switch on or off a non-basic coverage eNodeB, for example 218a, over the lattice of backhaul links 224 and/or capacity-extending backhaul links 216c-222c. In the example referred to in the previous sentence, peer eNodeBs can include immediately adjacent eNodeBs 208a, 210a, and 214a, but larger and smaller groupings are consistent with examples. The O&M module can be similarly notified over one or more CN communication links.

In examples relying on the 3GPP standard, the eNodeB Configuration Update procedure and the Cell Activation procedure can serve these roles respectively for switch-off and switch-on scenarios. Additionally, informed eNodeBs can maintain the relevant configuration data. Details for this energy saving functionality restricted to the switching on and off of capacity boosters are provided in greater detail in Section 2.4.4. of TS 36.300 of Release 10 for the LTE standard promulgated by the Third 3GPP.

Self-optimization functionality relying on capacity boosters 106a, 106b, as described, for example, in 3GPP LTE TS 36.300, however, is severely limited. Capacity boosters, by definition, are incidental to the basic coverage of a SON, irrespective of how light demands placed on the SON may be. However, scenarios often can occur where one or more basic coverage nodes 202a-214a are not needed to provide coverage. Standards like 3GPP LTE TS 36.300 are insufficiently flexible to take advantage of such scenarios.

Furthermore, capacity boosters 106a, 106b do not include MCN eNodeBs 202a-214a, or their equivalents, and are limited to LPNs, such as pico cells and femto cells, which by definition are already low power and low energy consuming nodes. The power consumed by an MCN, for example, is often greater than the power consumed by an LPN by more than an order of magnitude. Therefore, approaches like 3GPP LTE TS 36.300 are not only inflexible, but miss large potential gains in energy efficiency, which is a key optimization parameter for environmental and cost reasons.

In many scenarios, such as during times of light traffic, many eNodeBs 202a-222a, including MCN eNodeBs 202a-214a, can be switched off. Data traffic can vary in many ways that do not observe formalistic distinctions, such as that between the coverage areas associated with basic coverage nodes and non-basic coverage nodes. Studies indicate that often 75% of eNodeBs can be switched off without affecting coverage. Often, especially during times of light traffic, some of these eNodeBs could include MCN eNodeBs. Yet, unlike switching off an unessential capacity booster 106a, 106b, turning off a basic coverage node, like an MCN, with a large coverage area, without addressing service needs for UEs in the associated coverage area can create a coverage hole.

Exemplary examples are described below to increase the flexibility of SONs in ways that allow for more transmission nodes, including MCN eNodeBs 202a-214a, to be switched on/off to optimize energy savings and dynamically adapt to changing capacity demands. This added flexibility can also be used to optimize SONs with respect to additional parameters, such as mobility. Furthermore, these exemplary examples can build on previous standards, such as 3GPP LTE TS 36.300, or replace them. In certain exemplary examples, coverage can be insured for a selected coverage area 200 while switching off eNodeBs to optimize energy savings by reconfiguring transmission nodes in a selected coverage area with a common cell-ID, which can also be operated in an SFN mode.

The formation of an SFN with a common cell-ID can begin with the sharing of load information. The load from UEs 201a, 201b assigned to the various eNodeBs 202a-222a can be measured and exchanged over the lattice of backhaul communication links 224. Throughout the figures of this application, the magnitude of a load experienced by a transmission node is loosely depicted by the number of UEs that reside within the coverage area associated with that transmission node. Where UEs reside within multiple coverage areas, they can be considered to be represent loads that can be assigned to the multiple corresponding transmission nodes. The number of UEs within a coverage area can be interpreted as a relative number of UEs or a relative bandwidth requirement. The representations are provided as examples in the drawings. The actual loads can vary based on the system design and use.

Load information can also, or in the alternative, be shared with the O&M module 232 in the CN 230 over the CN communication links 226. Where load information is exchanged between transmission nodes 202a-222a over one or more X2 interfaces in examples consistent with LTE standards, the Relative Narrowband Transmission Power (RNTP) messages can be used to carry the load information between transmission nodes. Where load information is shared with the O&M module over S1 interfaces in examples consistent with LTE standards, load information can be included in the S1 Transport Network Layer (TNL) load.

Figure 3:
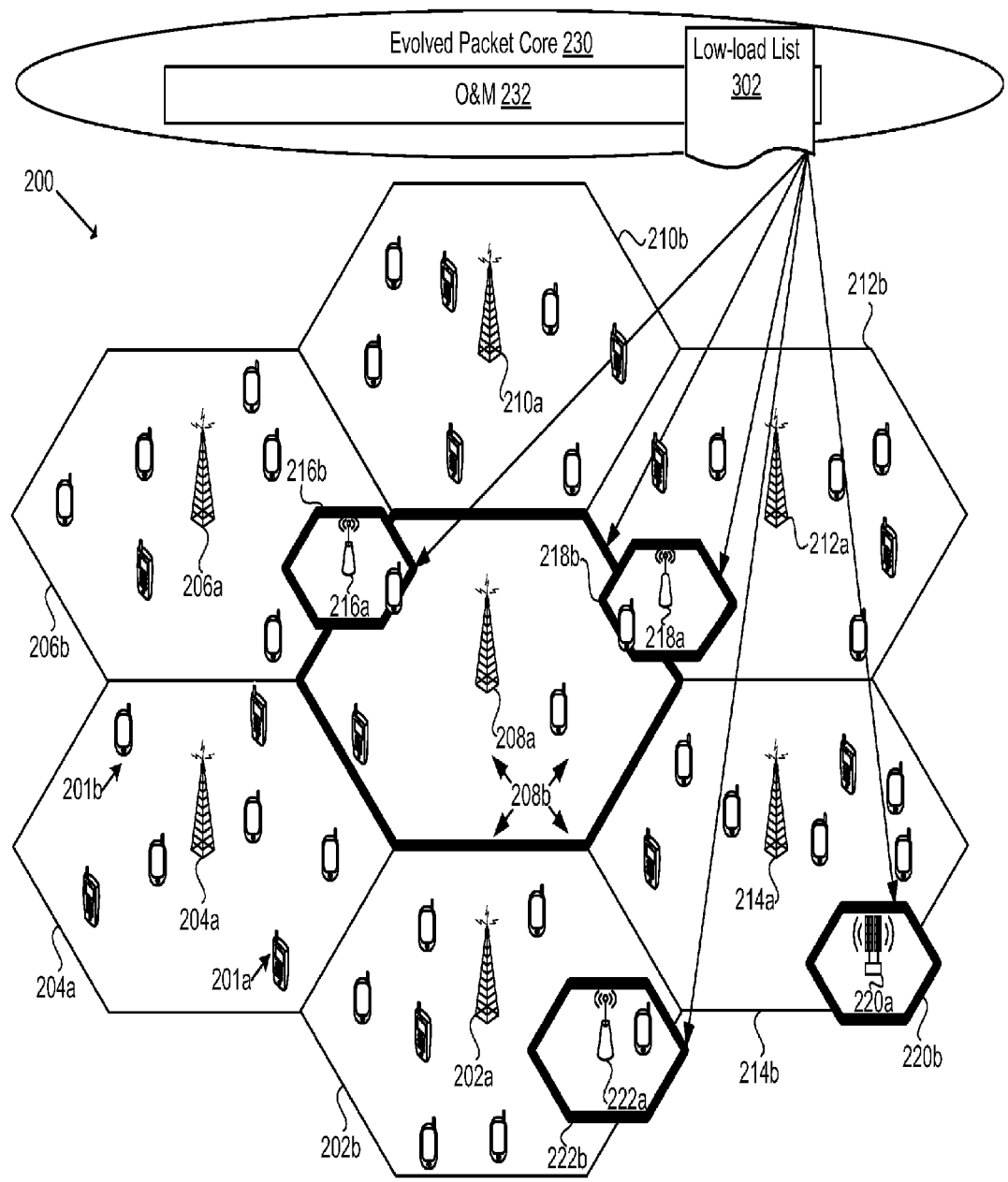
FIG. 3 is a block diagram illustrating the formation of a low-load list indicating transmission nodes/cells that can be considered for switching off to optimize the network with respect to energy.

FIG. 3 depicts the same loading scenario depicted in FIG. 2. The same selected coverage area 200 is depicted with the same transmission nodes 202a-222a and their corresponding coverage areas 202b-222b and the same CN 230 and the O&M module 232. The same number of UEs 201a, 201b are also distributed in the same locations. As can be appreciated, the coverage areas associated with some of the transmission nodes have relatively light traffic loads. These transmission nodes and/or the entire selected coverage area can be considered to be depicted at an off-peak hour.

For example, MCN eNodeB 208a only shows four UEs 101a, 101b within its coverage area 208b. Since each of two of these UEs are also in either the coverage area 216b for LPN 216b or the coverage area 218b for LPN 218b, MCN eNodeB 208a can be assigned as few as two or three UEs and as many as four. This is a comparatively light load compared to the other MCN eNodeBs 202a-206a, 210a-214a that vary between six and seven UEs in their respective coverage areas 202a-206a, 210a-214a. Additionally, the coverage areas 216b, 218b, and 222b pertaining to transmission nodes 216a, 218a, and 222a each only span a single UE. What is more, these single UEs are also susceptible to being assigned to MCN eNodeBs 208a, for transmission nodes 216a and 218a, and MCN eNodeBs 202a, for 222a. Despite the limited capacity of LPNs 216a, 218a, and 222a, the limited UE loads of one to none, can translate into relatively small loads. The RRH 220a also has a low load because there are no UEs in its coverage area 220b.

A low-load list 302, i.e., a list of eNodeBs within the selected coverage area 200, or a portion thereof, can be generated from the load information shared and/or exchanged over the lattice of backhaul communication links 224, capacity-extending backhaul links 216c-222c and/or CN communication links 226. As depicted in FIG. 3, the low-load list can be generated at the O&M module 232. However, the low-load list can also be generated at one or more transmission nodes within the selected coverage area in concert, or not in concert, with the O&M module.

As can be appreciated from the preceding discussion, the low-load list 302 can comprise MCN eNodeBs 208a and transmission nodes 216a, 218a, and 222a, as indicated by the corresponding arrows and emboldened boarders for coverage areas 208b, 216b, 218b, and 222b. As also can be appreciated, many consistent examples are not limited by the numbers of UEs discussed in determining the low-load list with respect to FIG. 3. The number of UEs can vary widely, and many additional, or alternative, parameters can be used for determining one or more thresholds for inclusion of a transmission node in a low-load list. Such thresholds and parameters can be responsive to a wide array of variables, such as, by way of example and not limitation, transmission power, proximity to adjacent transmission nodes, and/or nature of adjacent transmission nodes.

The low-load list 302 can be considered as containing candidate transmission nodes for consideration to switched off, but inclusion on the list need not mean that a transmission node is to be switched off. Unless no UE is assigned to the transmission nodes in the low-load list 302, turning off the transmission nodes can result in coverage holes and dropped service. However, determinations can first be made about whether adjacent transmission nodes can step in for transmission nodes in the low-load list before such transmission nodes can be switched off. Provision can also be made to handover UEs from transmission nodes in the low-load list. The discussion accompanying the following figures describes new technologies that make such determinations and handovers possible.

Figure 4:
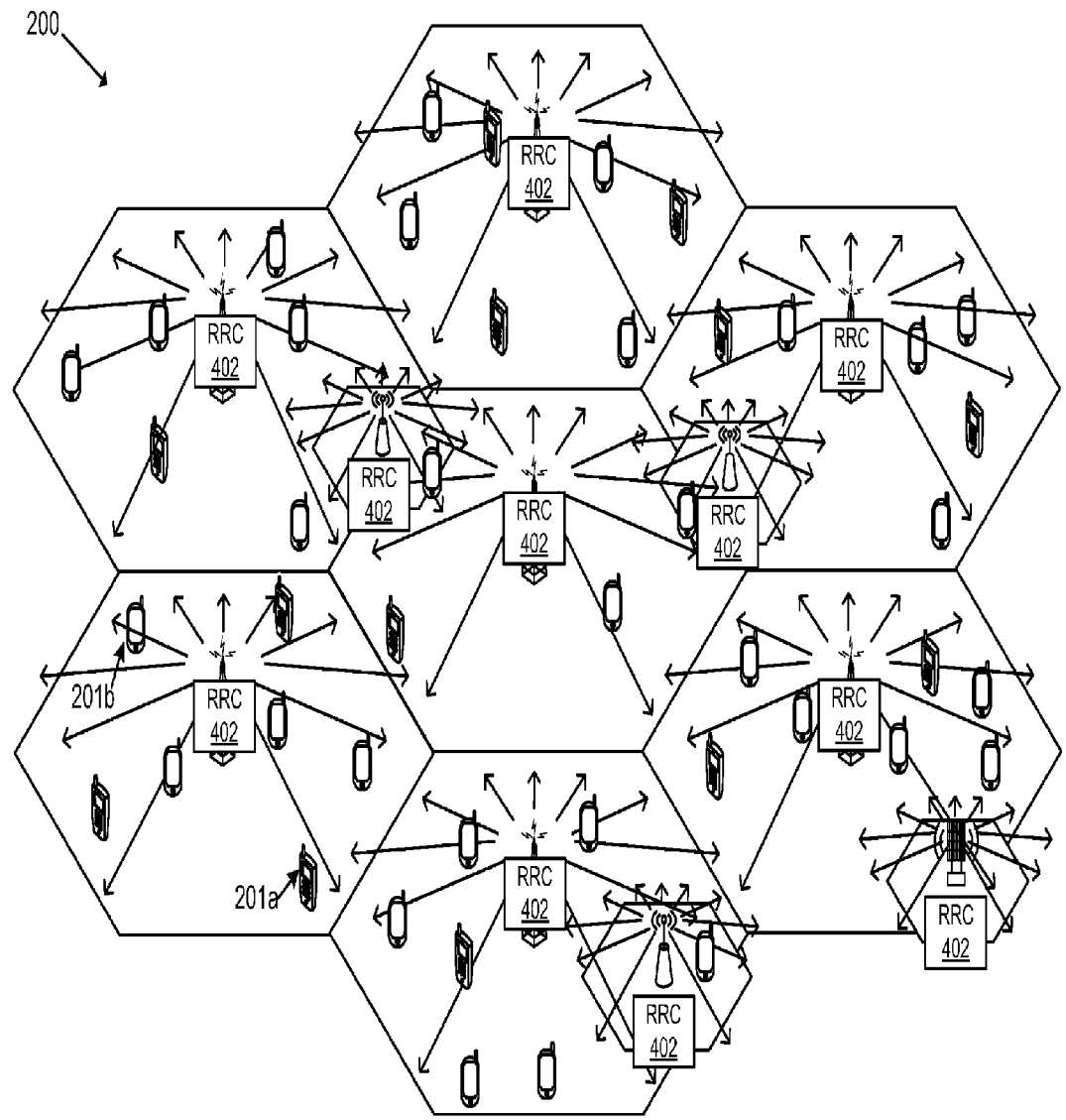
FIG. 4 is a block diagram illustrating the use of Radio Resource Control (RRC) messaging to broadcast Channel State Information-Reference Signal (CSI-RS) configuration information for new CSI-RSs created for yet-to-be configured Physical Cell Identifiers (PCIs)/Cell-IDentification (Cell IDs) in the wireless network.

FIG. 4 depicts an aspect of a technology that can be used to make previously impossible determinations used for self-optimization with increased flexibility. Such determinations can use channel state information measurements between UEs and multiple individual transmission nodes in a SON. With these measurements, determinations can be made to facilitate self-optimization beyond current abilities to optimize operation to meet capacity, coverage, mobility, energy efficiency, and user experience demands.

For example, such measurements can be used to determine the potential of a potential SFN to provide coverage over an area where other transmission nodes would potentially be switched off during reconfiguration of a SON. Without such predictive measurements, potential coverage holes could result from efforts to save power by switching off eNodeBs, other than those strictly designated capacity boosters which are non-essential to basic coverage. Additionally, such measurements can also be used where a wireless network is deployed to serve highway traffic, with different capacity and mobility management requirements during periods of traffic congestion, as opposed to off-peak hours. With such measurements, as discussed at a later portion of this application, a SON can reconfigure a set of cells during off-peak hours to use the same cell-ID to reduce the mobility overhead and later split the different cells to increase spectral efficiency during periods of high demand associated with traffic congestion.

In both classes of examples, measurements can aid the SON to determine the applicability of cell re-configuration and operation of multiple cells in an SFN mode before a re-configuration is applied. Also, where a set of cells operating in SFN mode with a common Cell-ID is reconfigured into cells with different Cell-IDs, the measurements can be used for mobility control to determine to which of the different Cell-IDs various UEs should be assigned. Therefore, measurements can facilitate: (1) providing feedback about the potential coverage if certain cells are switched off and remaining cells reconfigured to have cells with a common Cell-ID in an SFN before the reconfiguration is actually decided upon; and, (2) facilitate mobility management from a common Cell-ID to different Cell-IDs.

FIG. 4 depicts the same selected coverage area 200 with the same number of UEs 201a, 201b distributed in the same locations. However, FIG. 4 can be distinguished by the broadcast of a configuration message 402 from the various transmission nodes. Although all of the transmission nodes transmit the configuration message in FIG. 4, consistent examples can rely on a subset of transmission nodes transmitting the configuration message. The transmission nodes broadcasting the configuration message can be selected to ensure that the UEs in the selected coverage area receive the configuration message. In examples consistent with 3GPP LTE standards, the configuration message can be a Radio Resource Control (RRC) message. The role and contents of the configuration message can be discussed with respect to the following figure.

Figure 5:
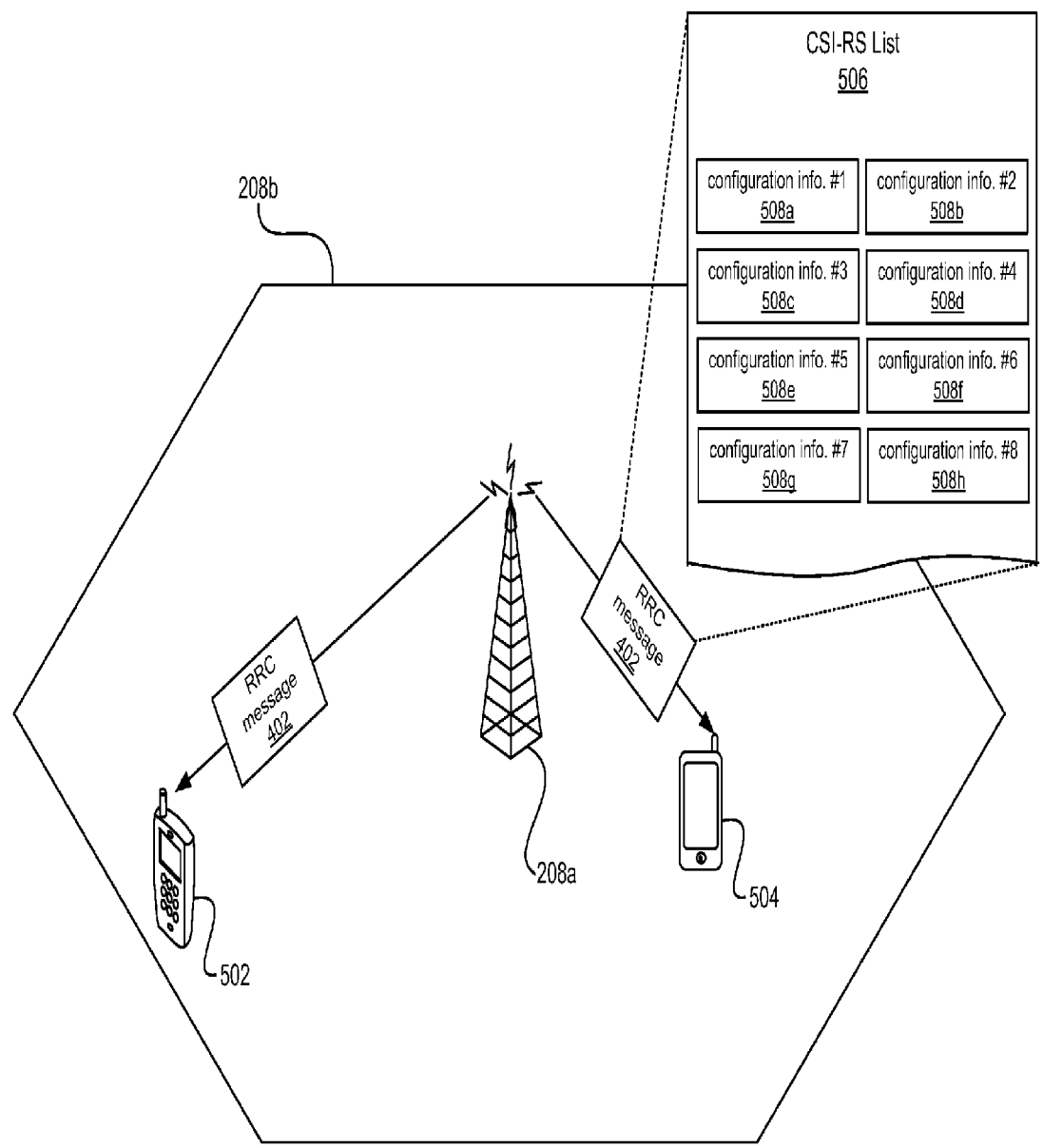
FIG. 5 is a block diagram illustrating a list CSI-RS configuration information for yet-to-be configured PCIs/Cell_IDs embedded in an RRC message as broadcast in the previous figure.

FIG. 5 depicts the configuration message 402 with a list of units of information for transmissions specific to yet-to-be-configured Cell-IDs, such as Channel State Information Reference Signals (CSI-RS), that can be used by UEs 502, 504 for measurements that can be correlated with yet-to-be-configured Cell-IDs. For purposes of illustration, only a portion of the selected coverage area 200 is depicted in FIG. 5, namely the coverage area 208a corresponding to MCN eNodeB 208a with the first UE 502 and the second UE 504 of the four UEs present therein.

The configuration message 402, which in examples consistent with 3GPP can be an RRC message, is depicted during transmission from MCN eNodeB 208a to the first UE 502 and the second UE 504. Although the same information can be transmitted to both UEs, for purpose of illustration, a portion of that information is depicted in the transmission to the second UE. As depicted, the configuration message can include a list 506, or set, of one or more units of configuration information 508a-508h for transmissions that can be used by UEs for channel state measurements. In examples consistent with 3GPP LTE, the transmissions can be CSI-RS transmissions and the units of information can provide configuration information about the CSI-RS transmissions.

In FIG. 5, the list 506, or set, comprises eight units of configuration information 508a-h. However, greater or fewer numbers of units of configuration can be found in the configuration message 402. A unit of configuration information can provide information linking transmissions used to measure channel information for one or more transmission nodes and/or cells from which they are transmitted with respect to the yet-to-be-configured Cell-IDs to which they belong, allowing optimization determinations to be made with respect to these yet-to-be-configured Cell-IDs.

In examples consistent with Release 10 and later LTE standards of the 3GPP, in which the transmissions used to measure channel information can comprise CSI-RS transmissions, the units of configuration information 508a-h can comprise information about the configuration of the CSI-RSs. This configuration information can provide information about parameters embedded in CSI-RSs. The embedded parameters can be indexed to one or more yet-to-be-configured Cell-IDs, and can be used by UEs measuring the CSI-RSs to link their measurements to such yet-to-be-configured Cell-IDs.

For example in examples making use of CSI-RSs, transmission-node-specific CSI-RSs can be generated at one or more transmission nodes and/or the O&M module 232. To produce transmission-node-specific CSI-RSs, existing approaches to CSI-RS generation can be modified. For example, CSI-RSs can be generated as a product of an orthogonal sequence and a pseudo-random sequence, where there can be three different orthogonal sequences and 168 different pseudo-random sequences, allowing for 504 unique cell identities (e.g., 0 to 503). A pseudo random sequence can be initialized with an initial sequence element, $c_{init}$, where $c_{init}$ is defined by Equation 1 as:

$$c_{init}=2^{10}\cdot(7\cdot(n_s+1)+l+1)\cdot(2\cdot N_{ID}^{Cell}+1)+2\cdot N_{ID}^{Cell}+N_{CP}. \quad (1)$$

Equation 1 is set forth in Section 6.10.1.1 of TS 36.211 for the LTE standard of the 3GPP for Releases 8 through 11. In this equation, $n_s$ is the slot number within a radio frame, l is the Orthogonal Frequency Division Multiplexing (OFDM) symbol, $N_{CP}$ is either 1 or 0 depending on whether the Cyclic Prefix (CP) is normal or extended respectively, and $N_{ID}^{Cell}$ is the PCI/Cell-ID for the respective cell transmitting CSI-RS. Since $N_{ID}^{Cell}$ is the PCI/Cell-ID for the respective cell transmitting the CSI-RS, such a CSI-RS lacks information that could be used to link measurements of such a CSI-RSs to a potential coverage characteristic for a yet-to-be-configured cell with a new Cell-ID.

However, by changing the term $N_{ID}^{Cell}$ to a configurable parameter 'X' that can be changed to correspond to various sets of transmission nodes/cells 202a-222a in a selected coverage area 200, measurements of a CSI-RS can be linked to a yet-to-be-configured Cell-ID and the corresponding transmission nodes/cells from which the CSI-RS is transmitted. Because of the three different orthogonal sequences and 168 different pseudo-random sequences that can be used to generated CSI-RSs, the parameter X can range, for example, from 0 to 503, and can be indexed to 504 different transmission nodes and/or cells, including transmission nodes and/or cells for which a Cell-ID has not yet been assigned.

Such yet-to-be configured cells can include multiple transmission nodes and/or cells to potentially be assigned with a common Cell-ID. In certain examples, the common Cell-ID can take a value previously assigned to a transmission node and/or cell within a potential SFN. For example, one or more eNodeBs and/or the O&M module 232 can configure the same initial sequence element, $c_{init}$, for the pseudo random sequence generated for the CSI-RS to be transmitted from different cells that are identified as potential candidates for SFN operation with a common Cell-ID. In such examples, one or more eNodeBs and/or the O&M module 232 can then instruct the candidate transmission nodes and/or cells to transmit the common CSI-RS on a common set of CSI-RS antenna ports, such as some combination of ports 15 to 22, over the same time-frequency resources. The selection of candidate cells is discussed in more detail below.

In certain examples, the parameter X can be set to a distinct value for one or more transmission nodes/cells based cells that previously shared a common PCI/Cell-ID with one or more transmission nodes/cells. Examples include scenarios where it is desirable to increase spectral frequency by removing one or more transmission nodes and/or cells from an SFN with a common Cell-ID. Additionally, examples can include scenarios where an LPN is coupled with an MCN eNodeB as a coverage booster, with a common ID, further increasing the flexibility with measurements can be made to optimize SONs.

Because the value of the parameter X, which is indexed to one or more transmission nodes/cells, can be embedded in the pseudo random sequence from which the CSI_RS can be derived, the one or more transmission nodes/cells to which the parameter X can be linked can be derived from the CSI-RS. To enable UEs to derive the one or more transmission nodes/cells transmitting a given CSI-RS the value of the parameter X, can be provided to those UEs.

The choice of parameter X can be included in the configuration message 402 depicted in FIG. 4 and FIG. 5 (cinitConfig_r12 in FIG. 6) so that UEs can derive the one or more transmission nodes/cells transmitting a given CSI-RS. Additionally, the choice of multiple instances of the parameter X can be communicated in the multiples units of configuration information 508a-508h in the configuration list, or set, 506. Measurements of the given CSI-RS can then be linked to the one or more transmitting transmission nodes/cells to share a yet-to-be-configured PCI/Cell-ID. Examples of such measurements that can be used for purposes of determining potential coverage can include Reference Signal Received Power (RSRP) measurements and/or Reference Signal Received Quality (RSRQ) measurements.

As can be appreciated, the use of CSI-RSs generated as discussed above can be used to provide feedback, in the form, for example, of RSRP/RSRQ measurements, from the UEs in a region that can potentially be optimized. The measurements can help a SON evaluate the coverage conditions and identify a set of transmission nodes and/or cells that can be turned off and the corresponding set of cells that can be configured with a common Cell-ID to transmit in SFN mode when the traffic loading indicates such a reconfiguration. The same principles discussed herein with respect to CSI-RSs can also be applied with respect to Cell-specific Reference Signals (CRSs).

FIG. 6 provides, by way of illustration and not limitation, Abstract Syntax Notation 1 (ASN1) source code that can be used by one of ordinary skill in the art to generate CSI-RSs. Such CSI-RSs could be flexibly assigned for transmission from one or more transmission nodes/cells regardless of whether corresponding Cell-IDs are yet to be assigned and/or different cell-IDs have already been assigned and could be used to identify the transmission nodes/cells from which they are transmitted. As can be appreciated, those of ordinary skill in the art can produce such CSI-RSs by alternative approaches. Additionally, those of ordinary skill in the art can generate alternative, CSI-RS or non-CSI-RS, transmissions used to measure channel information for one or more transmission nodes/cells from corresponding with a yet-to-be-configured PCI/Cell-ID, both consistent with LTE and other standards.

Figure 7:
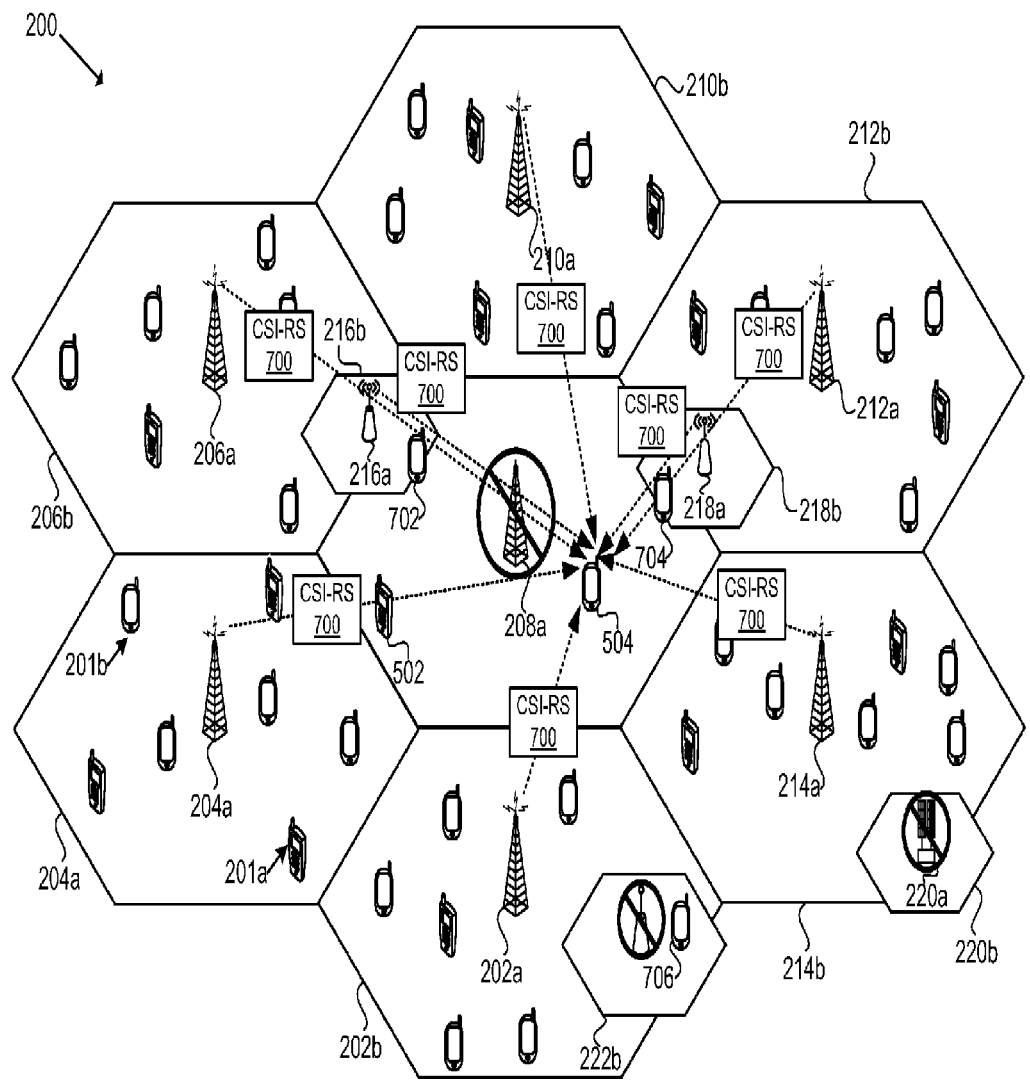
FIG. 7 is a block diagram illustrating CSI-RSs from individual transmission nodes/cells in the wireless network to a representative User Equipment.

FIG. 7 depicts transmission of a common CSI-RS 700 from a candidate set of transmission nodes and/or cells for a potential SFN with a common Cell-ID. Again, the same selected coverage area 200, transmission nodes 202a-222a, corresponding coverage areas 202b-222b, and number of UEs 201a, 201b distributed in the same locations are depicted as in FIG. 2. Also, the first UE 502 and the second UE 504 in coverage area 208b are depicted, together with the newly numbered third UE 702, within coverage areas 208b and 216b, and the newly numbered fourth UE 704, within coverage areas 208b and 218b. The fifth UE 706, within coverage areas 202b and 222b, is also numbered.

The first UE 502 through the fifth UE 706 reside in at least one coverage area pertaining to a transmission node on the low-load list 302, meaning that the coverage of these UEs could potentially be disturbed by the switch-off of a transmission node on the low load list. To avoid coverage disruption, a common CSI-RS 700 is transmitted from those transmission nodes 202a, 204a, 206a, 210a, 212a, 214a, 216a, and 218a within candidate set of transmission nodes and/or cells for a potential SFN with a common PCI/Cell-ID corresponding to the common CSI-RS.

As can be appreciated from the crossed out circles and lack of transmission arrows, transmission nodes 208a, 220a, and 222a are not included in the candidate set of transmission nodes and/or cells for a potential SFN with a common PCI/Cell-ID for the scenario depicted in FIG. 7. Although only one candidate set of transmission nodes and/or cells is depicted, a similar common CSI-RS can be sent for multiple different candidate sets of transmission nodes and/or cells. Indications from resultant measurements of the potential coverage area associated with the various candidate sets can be compared. In these comparisons, potential energy savings can be weighed.

Various approaches can be used to determine and/or generate candidate sets from which a common CSI-RS can be transmitted. Candidate sets can be determined at one or more transmission nodes 202a-222a and/or the O&M module 232. In some examples, the low-load list 302 can be used to generate different candidate sets. However, the low-load list is not necessary to all examples. In examples that do not make use of the low-load list, candidate sets can be generated as subsets of the low-load list.

In certain examples, a candidate set can be generated for every possible subset of a low-load list. Since the number of possible candidate sets generated is the product of binary choices to include or exclude each transmission node/cell on the low-load list in a given candidate set, the number of possible candidate sets would be equal to $2^n$, where n is the number of candidate transmission nodes/cells in the low load list. With respect to the low-load list 302 depicted in FIG. 3, for example, $2^5$, or 32, possible candidate sets are possible, because there are 5 transmission nodes included in the low-load list, as depicted.

In certain examples, constraints can be placed on candidate sets that can be generated from a low-load list to limit the transmission of common CSI-RSs. Examples, provided by way of example and no limitation, can include a minimum number of transmission nodes and/or cells, and/or high-power transmission nodes, such as MCN eNodeBs, to be excluded from possible candidate sets to make energy savings worthwhile. Additionally, a low-load list can be used in other ways and/or in combination with other considerations to generate possible candidate sets. For example, cells associated with certain frequency bands and/or transmission nodes within certain geographic regions can be given priority for inclusion and/or exclusion from potential candidate sets. Such examples can be implemented without consideration of a low-load list.

In the case depicted in FIG. 7, for purposes of illustration, transmission of the common CSI-RS 700 is depicted from transmission nodes 202a, 204a, 206a, 210a, 212a, 214a, 216a, and 218a in the candidate set. Yet, the transmission is only depicted as being received by the second UE 504. However, the transmission of the common CSI-RS can also be received by other UEs in the selected coverage area 200. Indeed, the common CSI-RS can be transmitted, among other potential reasons, to determine the ability of UEs to detect and/or measure the common CSI-RS and/or the strength at which the common CSI-RS can be measured at various UEs within the selected coverage area.

In certain examples, such as the one depicted in FIG. 7, the common CSI-RS 700 can be transmitted by all transmission nodes (202a, 204a, 206a, 210a, 212a, 214a, 216a, and 218a) and/or cells in the candidate set. In other examples, only a subset of the transmission nodes and/or cells in the candidate set can transmit the common CSI-RS. For example, in some examples, only transmission nodes/cells geographically and/or spectrally relevant to transmission nodes/cells not in the candidate set can transmit the common CSI-RS. In such examples, the resources tied up could be reduced to a minimum associated with those UEs with an increased likelihood of coverage problems from transmission nodes/cells, not in the candidate set, that would be switched off. In the case depicted in FIG. 7, the first UE 502 through the fifth UE 706 (502, 504, 702, 704, and 706), could experience an increased likelihood of coverage problems because they are located in at least one coverage area associated with a transmission node/cell not included in the set of candidate transmission nodes/cells.

The common CSI-RS 700 received by the second UE 504 can be used by the second UE to generate measurement(s) that can be used to determine the potential coverage from the candidate set in the area of the second UE. In alternative examples, non-CSI-RS transmissions can be used to generate similar measurements. Reception of the common CSI-RS by other UEs in the selected coverage area 200 can be used for similar measurements and/or determinations.

Figure 8:
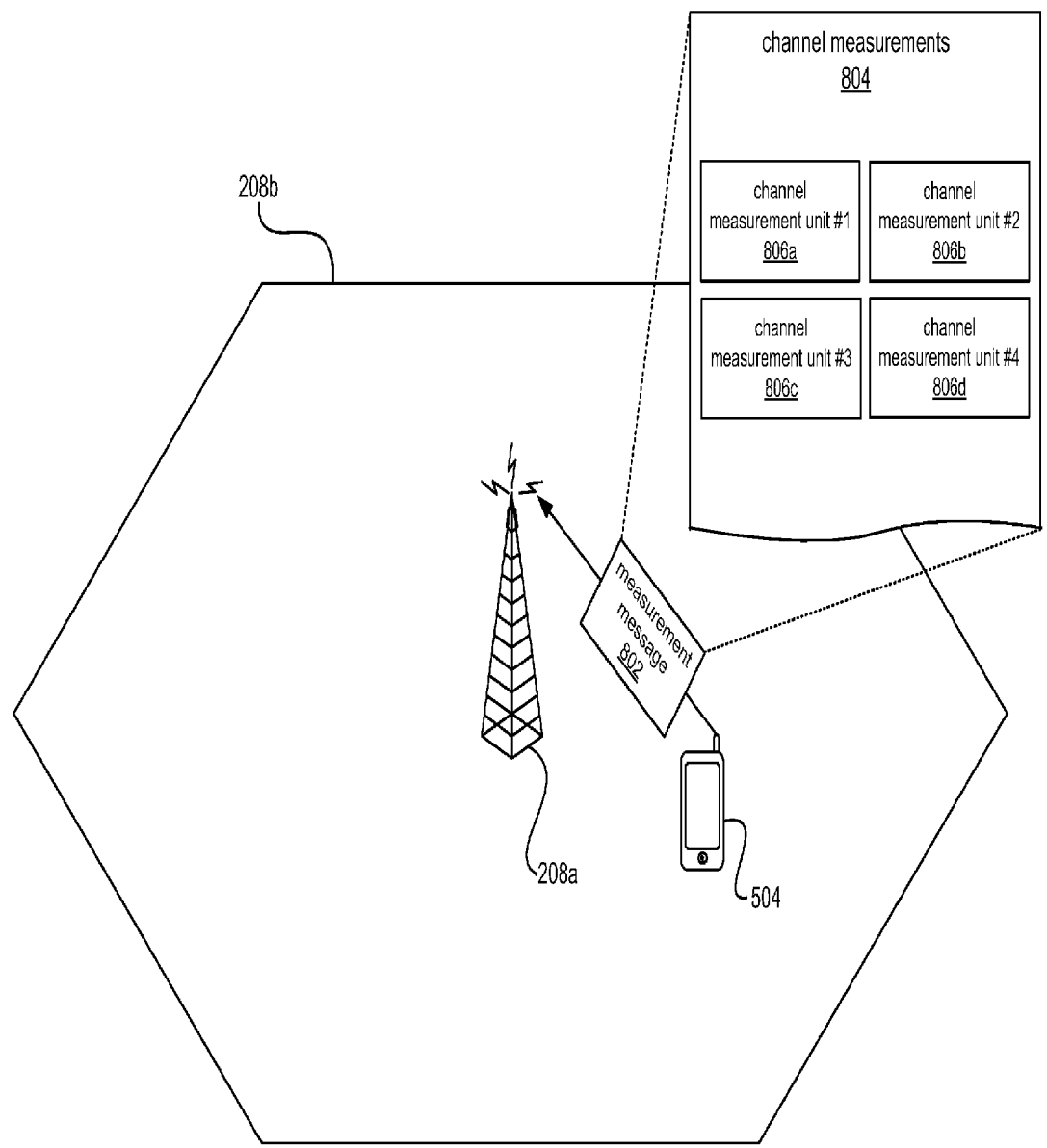
FIG. 8 is a block diagram illustrating UpLink (UL) transmission of a measurement message from a representative UE to a representative transmission node, the measurement message containing Received Power (RSRP) and/or Reference Signal Received Quality (RSRQ) measurements for yet-to-be configured PCIs/Cell_IDs that can be used to make determinations for optimizing the wireless network.

FIG. 8 depicts an UpLink (UL) transmission of a measurement message 802 from the second UE 504 that can contain one or more measurements similar to those discussed above. For purposes of illustration, only a portion of the selected coverage area 200 is depicted in FIG. 8, namely the coverage area 208a corresponding to MCN eNodeB 208a with the second UE of the four UEs present therein. The measurement message 802 can contain a set 804 of channel measurement units 806a-d.

Although four channel measurement units 806a-d are depicted, as can be appreciated, greater or smaller numbers of channel measurement units are consistent with examples. In some exemplary examples, an exemplary UE 504 makes a measurement after each CSI-RS, such as the common CSI-RS depicted in FIG. 7 and transmits a measurement message containing a single channel measurement unit.

In other examples, an exemplary UE 504 makes measurements of multiple transmissions, such as CSI-RSs, resulting in multiple channel measurement units, which can be compiled by the exemplary UE and transmitted in the same measurement message 802. An indication can be provided to the UE, for example in a configuration message 402 similar to the one depicted in FIG. 4, indicating a number of candidate sets and/or CSI-RSs associated therewith. In such examples, the UE can wait until the UE has prepared a channel measurement unit for each candidate set, or some subset thereof, before sending a measurement message with the corresponding channel measurement units. By way of example and not limitation, in examples consistent with the 3GPP LTE standards, a channel measurement unit 806 can contain one or more RSRP and/or RSRQs measurements.

Although only the second UE 504 is depicted in FIG. 8 for ease of illustration and to pick up where the last figure left off, other UEs in the selected coverage area 200 can make similar measurements and provide similar measurement messages 802. In some examples, all UEs in the selected coverage area can be configured to provide a measurement message. In alternative examples, a subset of the UEs, to the exclusion of other UEs in the selected coverage area, can be configured to provide one or more measurement messages, resulting in a reduction of overhead. A UE can be configured to provide such a measurement by one or more transmission nodes within the SON.

In certain examples in which only a subset of UEs provides one or more measurement messages 802, the subset can be restricted to UEs with an increased likelihood of potential coverage problems if a potential optimizing reconfiguration takes place. For example, such a subset could comprise UEs within, or near, coverage areas, or with communication links at certain frequencies that could be affected by a reconfiguration. Inclusion in a low-load list 302 and/or exclusion from a candidate set of a transmission node/cell associated with a coverage area spanning a UE provide non-limiting examples of criteria for inclusion in such a subset. For the case depicted in FIG. 7, the first UE 502 through the fifth UE 706 (502, 504, 702, 704, and 706) would satisfy both of these criteria.

Figure 9:
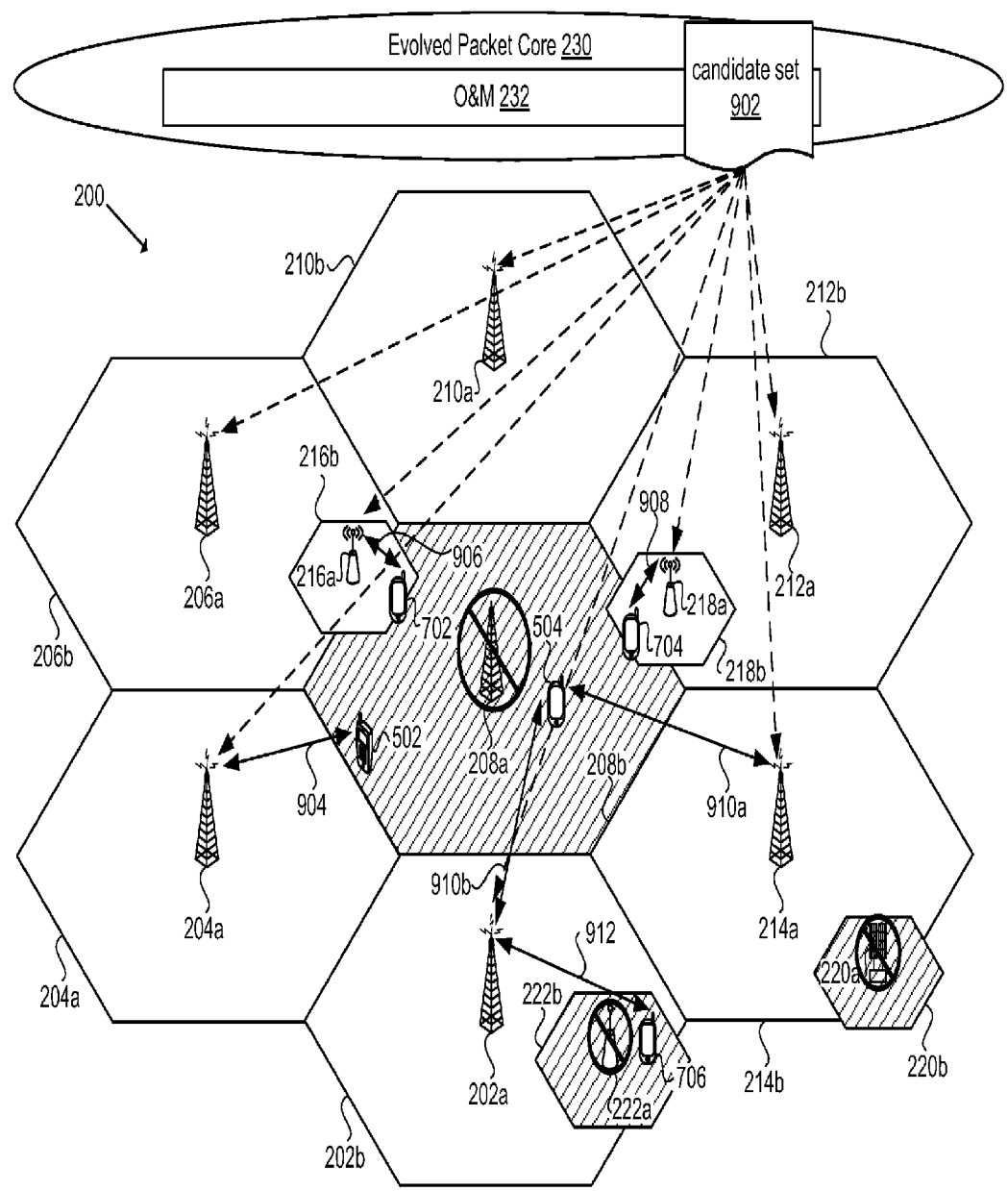
FIG. 9 is a block diagram illustrating the formation of a candidate list that excludes transmission nodes/cells that have been switched off, together with potential communication links with various transmission nodes/cells that can prevent any coverage holes based on measurements for yet-to-be configured PCIs/Cell_IDs provided to the network from UEs within coverage areas of transmission nodes/cells to be switched off.

FIG. 9 depicts potential coverage sources for an acceptable candidate set 902 of transmission nodes and/or cells. Once again, the same selected coverage area 200 is depicted with the same transmission nodes 202a-222a and their corresponding coverage areas 202b-222b, together with the same CN 230 and the O&M module 232, as in FIG. 2. Although the candidate set 902 is depicted as residing in the O&M module, data comprising the candidate set can also, or in the alternative, reside in one or more of the transmission nodes 202a-222a.

The candidate set 902 depicted in FIG. 9 includes the same transmission nodes (202a, 204a, 206a, 210a, 212a, 214a, 216a, and 218a) involved in the transmission of the common CSI-RS 700 in FIG. 7, excluding the same set of excluded transmission nodes (208a, 220a, and 222a). Transmission nodes in the set of excluded transmission nodes would not transmit and/or receive signals, resulting in corresponding potential coverage holes (208b, 220b, and 222b), illustrated by the cross-hatching, corresponding to the coverage areas (208b, 220b, and 222b) corresponding to those transmission nodes (208a, 220a, and 222a). The first UE 502 through the fifth UE 706 (502, 504, 702, 704, and 706) could potentially be impacted by these potential coverage holes.

However, channel measurement units 806, similar to those discussed in the preceding figure, received by transmission nodes/cells in the SON from one or more of the first UE through the fifth UE (502, 504, 702, 704, and 706), can provide information that can be used to make a determination that the candidate set 902 provides an acceptable level of coverage. The determination can be made at one or more of the transmission nodes 202b-222b and/or the O&M module 232, and information necessary to made such determination can be passed over the lattice of backhaul communication links 224 and/or the CN communication links (FIG. 2).

A determination that a candidate set 902 is acceptable can be made after comparing channel measurement units 806 to one or more thresholds based on one or more factors. Examples of such thresholds and/or factors can include, by way of illustration and not limitation, minimum signal strength levels for one or more UEs for UL and/or DownLink (DL) communications, Quality of Service (QoS) requirements for one or more UEs, statistically based margins of error for potential increases in demand with respect to bandwidth and/or quality. Such thresholds and/or factors can be based on considerations specific to the 3GPP LTE standards and/or other standards.

A determination can be made that the candidate set 902 in FIG. 9 is acceptable based, in part, on exemplary, but non-limiting, substitute communication paths 904-912 for transmissions to and from the UEs (502, 504, 702, 704, and 706) in the potential coverage holes (208*b*, 220*b*, and 222*b*). With respect to the first UE 502, a first substitute communication path 904 can arise between the first UE and transmission node 204*a*. The proximity of the first UE to the boundary of the coverage area 204*b* corresponding to transmission node 204*a* can make the first substitute communication path 904 particularly effective.

Skipping the second UE 504 for a moment, although both the third UE 702 and the fourth UE 704 are located in potential coverage hole 208*b*, they are also located in respective coverage area 216*a* and coverage area 218*b* associated with respective LPN 216*a* and LPN 218*a*, both of which are in the candidate set. Therefore, a third substitute communication path 906 can arise between the third UE and LPN 216*a*, and a fourth substitute communication path 908 can arise between the fourth UE and LPN 218*a*. Conversely, the fifth UE 706 is within the potential coverage hole 222*b* associated with LPN 222*a*. But, the fifth UE is also within the coverage area 202*b* of MCN eNodeB 202*a*. Therefore, a fifth substitute communication path 912 can arise between the fifth UE and MCN eNodeB 202*a*.

Returning to the second UE 504, the location of the second UE can be used to discuss an interesting example. The second UE is located within the potential coverage hole 208*a* associated with high-power transmission node 208*a*, meaning that potential coverage hole 208*a* can potentially span a large area. Since the second UE is located near the center of this potential coverage hole, it can be relatively distant from transmission nodes in the candidate list 902. In certain examples, a single transmission node can provide sufficient substitution for high-power transmission node 208*a*. In some cases, one substitute transmission node may not be sufficient, or better coverage can be provided by multiple substitute transmission nodes.

In such cases, Coordinated Multi-Point (COMP) can be used in examples consistent with the 3GPP LTE standards, or analogous functionality with respect to examples consistent with other standards. In such examples, COMP can be applied to both the transmission of the common CSI-RS 700 and after reconfiguration. In FIG. 9, COMP can lead to a second substitute communication path 910 with a first sub-path 910*a* between the second UE 502 and transmission node 214*a* and lead to a second sub-path 910*b* between the second UE 502 and transmission node 202*a*.

Once an SFN is formed, contributions can be made to the DL communications from all active transmission nodes in the SFN in addition from those involved in the substitute communication paths (904, 906, 908, 910*a*, 910*b*, and 912). With respect to UL communications, UEs (502, 504, 702, 704, and 706) in the potential coverage holes (208*b*, 220*b*, and 222*b*) may need to become re-associated with new transmission nodes/cells. Furthermore, adaptation of the single common Cell-ID can involve handover, and/or reconfiguration, of UEs in the SFN not associated with the common Cell-ID. Additionally, examples where it can be desirable to break-up an SFN with a common Cell-ID, resulting in multiple Cell-IDs, can result in additional UE handovers and/or reconfigurations. Additional, new approaches to UE handover and/or reconfiguration can be applied to address large numbers of UEs associated with such optimizations. These new approaches can also be tailored to special considerations that arise in examples that provide optimization with increased flexibility.

The scenario described above explains underlying principles, but may not fully capture the potential for power savings. Alternative scenarios are possible in which much greater power savings are possible. For example, multiple high power transmission points can be switched off. In one such example, a candidate set 902 in which alternating MCN eNodeBs are considered for switching off can be presented. With respect to FIG. 9, such an example could result in turning off transmission points 202*a*, 206*a*, and 212*a*. Transmission points 204*a*, 210*a*, and 214*a* can remain on. In such examples the LPNs can remain on to handle traffic load, or be switched off, as can also be the case with transmission point 208*a*.

Figure 10:
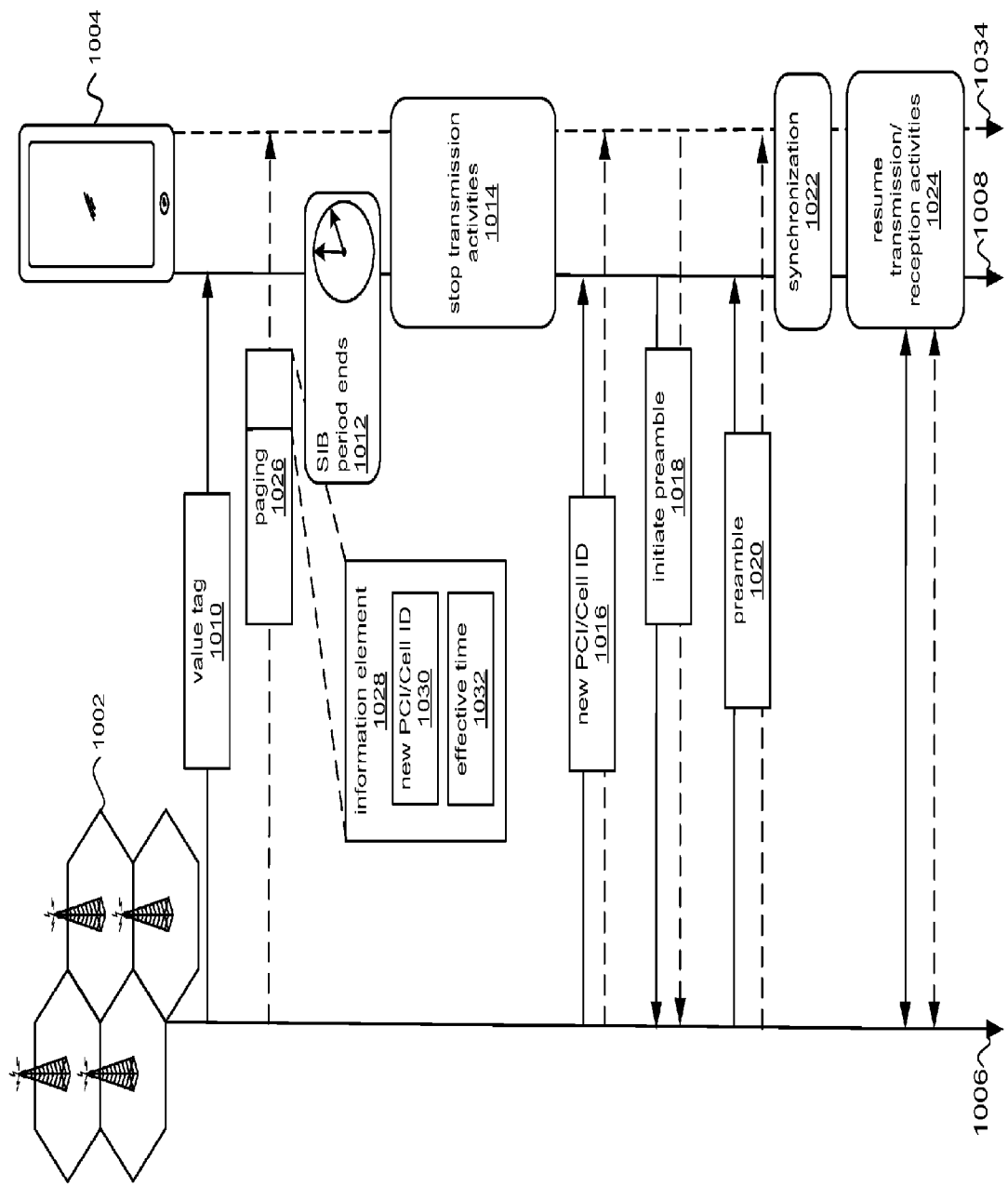
FIG. 10 is a block diagram illustrating two exemplary ways in which UEs can be reconfigured for a new PCI/Cell-ID during a self-optimizing change.

FIG. 10 is a block diagram illustrating two new, exemplary ways in which UE reconfiguration can be provided for a new Cell-ID during a self-optimizing change, without a full handover procedure. An exemplary SON 1002 is depicted in communication with an exemplary UE 1004. To facilitate reconfiguration of the UE associated with a transmission node and/or cell whose Physical Cell Identifier (PCI)/Cell-ID will be changed, the SON can indicate such changes to the UE, which can reconfigure itself accordingly, by several approaches.

According to a first approach, illustrated with respect to the SON timeline 1006 and the first UE timeline (solid arrow) 1008, an indication can be provided in a value tag 1008 transmitted from a transmission node/cell in the SON 1002. The value tag can indicate that a Cell-ID associated with the UE 1004 can be changed in the next System Information Block (SIB) modification period.

Upon receiving the value tag 1008, the UE 1004 can wait until the end of the System Information Block (SIB) modification period 1012. The UE can then stop transmission activities 1014 until it receives a new PCI/Cell-ID 1016, which the UE can substitute for an old PCI/Cell-ID. Upon receiving the new PCI/Cell-ID, the UE can trigger a measurement report and/or initiate the sending of a preamble 1018 to measure an UL time. Once the preamble is sent 1020, the UE can make a measurement with which to achieve synchronization 1022 for the new PCI/Cell-ID. Once synchronization is achieved, transmission and/or reception activities can resume 1024 with the UE reconfigured for the new PCI/Cell-ID.

According to a second approach, illustrated with respect to the SON timeline 1006 and the second UE timeline (dashed arrow) 1038, a paging message 1026 can be sent from a transmission node/cell in the SON 1002 to indicated a change of PCI/Cell-ID. The paging message can include an Information Element (IE) 1028. The IE can include the new PCI/Cell-ID 1030 and an effective time 1032 for the new PCI/Cell-ID, i.e., a time corresponding to the new PCI/Cell-ID when the new PCI/Cell-ID will be effective. In certain examples, the effective time can be provided in terms of a System Frame Number.

As with the previous approach, the UE 1004 can stop transmission 1014 after the effective time 1032. A transmission node/cell in the SON 1002 can transmit the new PCI/Cell-ID 1016 to the UE. Upon receipt of the new PCI/Cell-ID by the UE, the UE can again use the new PCI/Cell-ID to replace the old PCI/Cell-ID. The UE can also trigger a measurement report and/or initiate 1018 the sending of a preamble to measure an UL time. Once the preamble is sent 1020, the UE can make a measurement with which to achieve synchronization 1022 for the new PCI/Cell-ID. Once synchronization is achieved, transmission and/or reception activities can resume 1024 with the UE reconfigured for the new PCI/Cell-ID.

Figure 11:
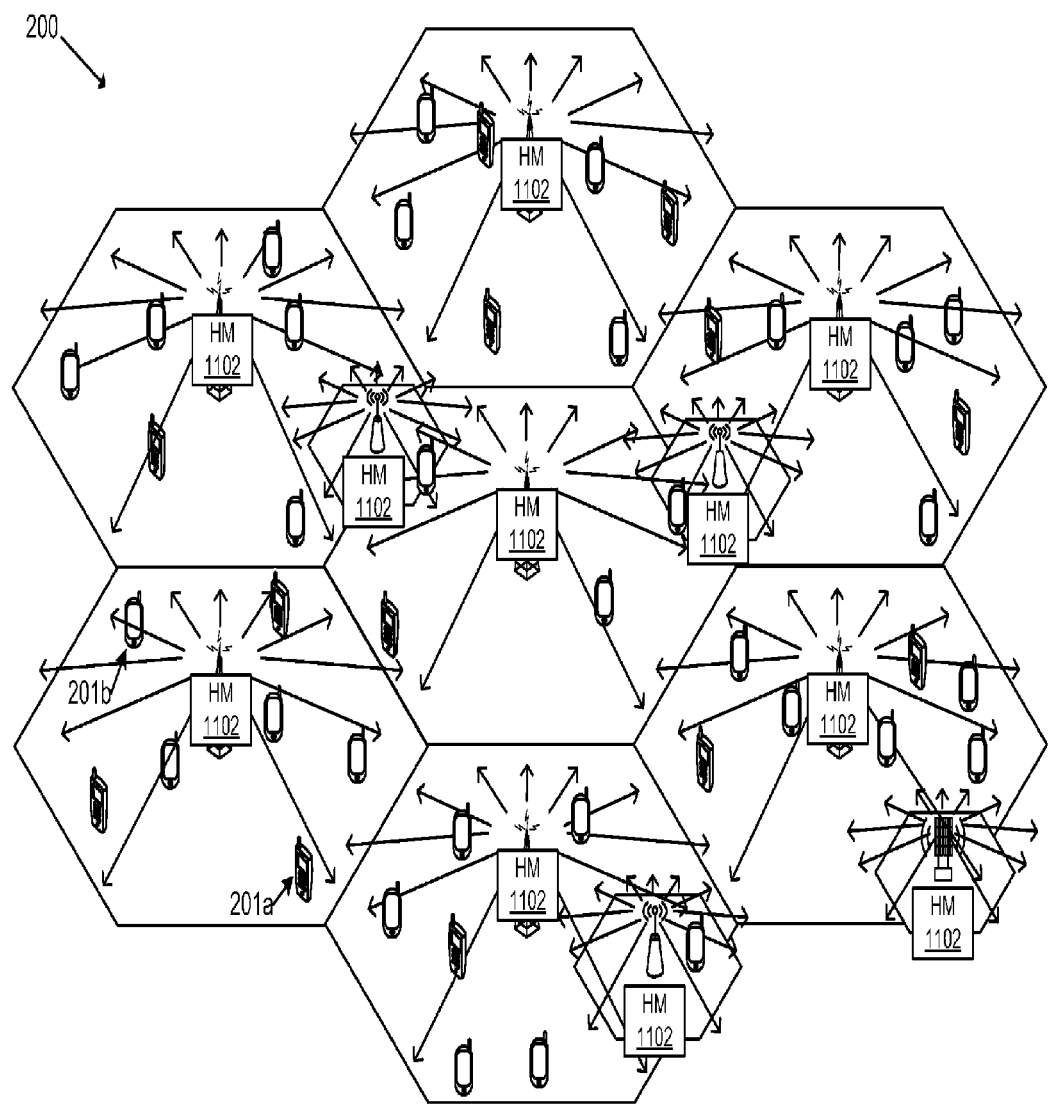
FIG. 11 is a block diagram illustrating the broadcasting of a handover message pertaining to an additional exemplary approach to hand-over that reduces overhead based on a group handover.

FIG. 11 depicts an alternative approach to mobility management based on group handover. Again, the same selected coverage area, at the same time, 200 is depicted with the same number of UEs 201a, 201b distributed in the same locations. However, FIG. 11 can be distinguished by the transmission of the same handover message 1102 from the various transmission nodes. Although all of the transmission nodes transmit the handover message in FIG. 11, consistent examples can rely on a subset of transmission nodes transmitting the handover message. The transmission nodes transmitting the handover message can be selected to ensure that the UEs in the selected coverage area receive the handover message.

As can be appreciated from the UEs depicted in FIG. 11, when a cell is reconfigured, there may be a number of UEs in the connected mode. The overhead associated with the handover of all these UEs to enable the UEs to transmit/receive correctly with a new Cell-ID/PCI can be quite large. If reconfiguration occurs relatively often to adapt to a changing traffic load situation, or the number of UEs located in the selected coverage area 200, the overhead burden for the many mobility actions for the multiple UEs at each reconfiguration can be significant.

However, handover for such reconfigurations can be made more efficient with support for group handovers. Accordingly, the handover message 1102 can comprise the same handover command message, which, as depicted in FIG. 11 can be transmitted to multiple UEs. In certain examples, the transmission of the same handover message can be accomplished via multicast signaling.

Figure 12:
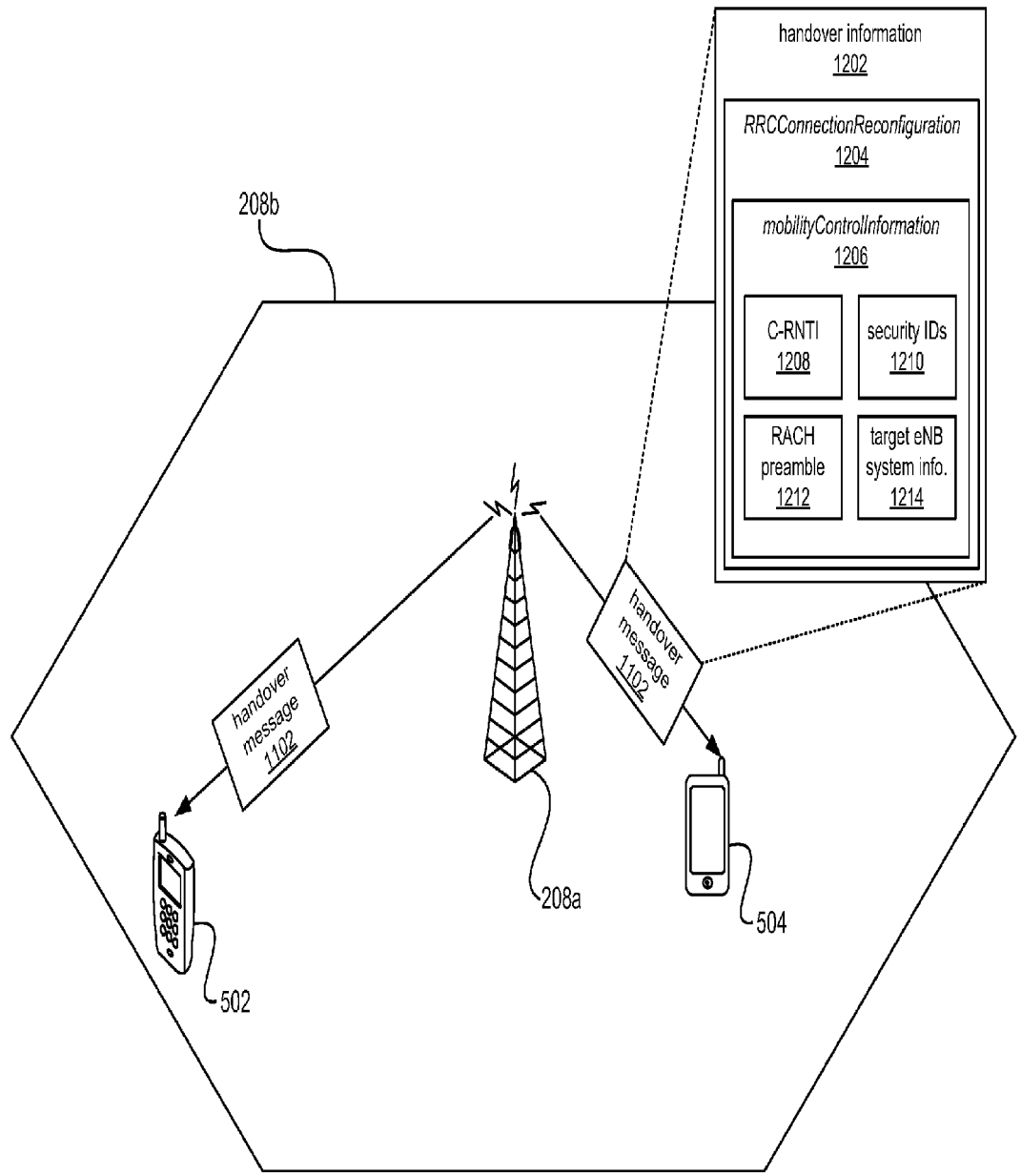
FIG. 12 is a block diagram illustrating potential contents of a handover message for group handover as received by a representative UE from a representative transmission node/cell.

FIG. 12 depicts potential contents of a handover message 1102 for group handover, as received by a representative UE 504 from a representative transmission node 208a. For purposes of illustration, only a portion of the selected coverage area 200 is depicted in FIG. 12, namely, the coverage area 208a corresponding to MCN eNodeB 208a with the first UE 502 and the second UE 504 of the four UEs present therein. Although the same handover message 1102 is depicted as being transmitted to the first UE and the second UE, handover information 1202 therein is only depicted with respect to the transmission to the second UE for purposes of illustration.

In examples consistent with the 3GPP LTE standards, the handover message 1102 can comprise an RRC message, such as an RRCConnectionReconfiguration message 1204 including mobilityControlInformation 1206. This RRC message can provide, by way of illustration and not limitation, values for parameters such as a new Cell Radio Network Temporary Identifier (C-RNTI), target eNodeB security algorithm identifiers, an optionally dedicated Random Access CHannel (RACH) preamble, and/or target eNodeB system information, among other potential items of information. Analogous units of information consistent with non-LTE standards can be provided in the handover message in examples consistent with other standards.

The target eNodeB system information, such as one or more SIBs, can be common for all UEs, or a set thereof, designated for handover to the same target cell. Therefore, one RRC signaling message, including one or more target SIBs, can be transmitted to those UEs via multicast signaling. In some examples, an RRC signaling message can include both common parameter values and UE specific parameter values for all UEs designated for handover.

Figure 13:
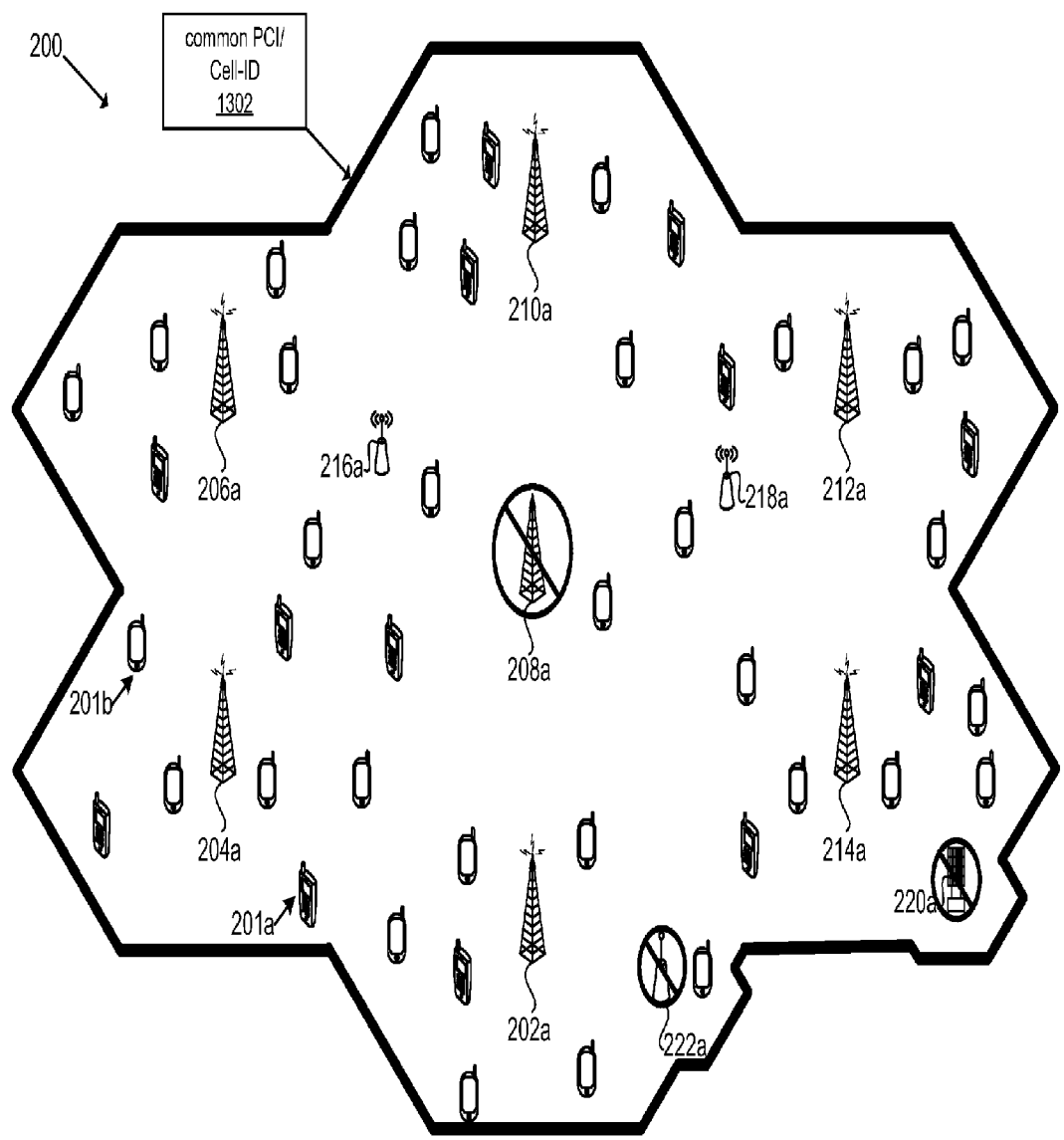
FIG. 13 is a block diagram illustrating the formation of a network self-optimized to reduce energy by switching off a variety of transmission nodes/cells, including a Macro eNodeB, sharing a common PCI/Cell-ID.

FIG. 13 depicts a resultant SFN with a common PCI and/or Cell-ID 1302. As can be appreciated, the common and/or Cell-ID applies across all transmission nodes and/or cells within the selected coverage area 200. Yet again, the same selected coverage area, at the same time, 200 is depicted with the same number of UEs 201a, 201b distributed in the same locations. Also, the same transmission nodes 202a-222a are depicted, but without their corresponding coverage areas 202b-222b. Since all of the transmission nodes correspond to the same SFN with a common PCI/Cell-ID, distinctions between coverage areas no longer obtain.

Furthermore, the transmission nodes (202a, 204a, 206a, 210a, 212a, 214a, 216a, and 218a) within the candidate set 902 described with respect to FIG. 9 are depicted in an active state, as indicated by the lightning bolt and ripple symbols. However, transmission nodes not in the candidate set are depicted in a switched-off state (208a, 220a, and 222a), as indicated by the emboldened circles with the crossbars and the lack of lightning bolt and ripple symbols. As indicated by the bold lines used to demark the boundary of the common PCI and/or Cell-ID 1302, the new common PCI/Cell-ID is applied for the SFN across the entire selected coverage area 200.

Because of the switched-off state of certain transmission nodes (208a, 220a, and 222a) in the selected coverage area 200, significant energy savings can be obtained by the SFN. These energy savings are further increased significantly because of the high-power transmission node 208a, which can be an MCN eNodeB, included among the switched-off transmission nodes. The new CSI-RSs and resultant measurements could confirm coverage across the SFN before reconfiguration to allow for increased flexibility in the optimizations that can be performed, including optimizations that can switch off high-power transmission nodes. Additionally, several new approaches to reconfigure UEs for changes in cell identification, as discussed above, make possible efficiencies in mobility management that can become important with such optimizations. After formation of an SFN with a common Cell-ID 1302, optimization of coverage can be achieved by antenna tilting.

Such energy saving is made possible by low traffic loads within the selected coverage area 200. However, traffic loads can be dynamic in ways that result in scenarios not suited for a previously appropriate SFN with a common PCI/Cell-ID. As traffic loads increase and, perhaps become concentrated in certain geographic regions, it may become desirable to split up an SFN, such as the one depicted in FIG. 13.

Figure 14:
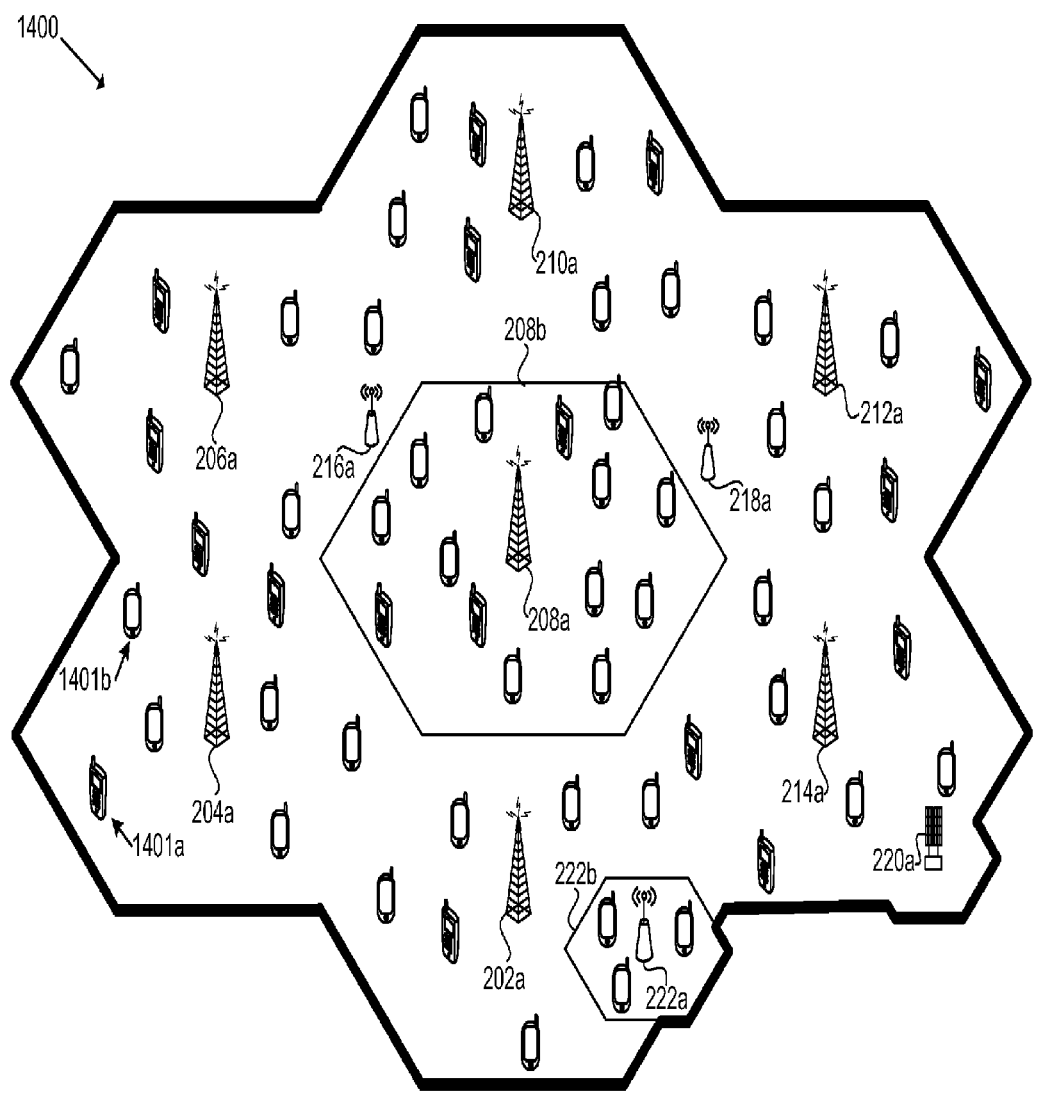
FIG. 14 is a block diagram illustrating a redistribution of traffic within a network sharing a common PCI/Cell-ID, previously self-optimized to reduce power.

FIG. 14 depicts the selected coverage area with a redistribution of traffic 1400 within the SFN sharing the common PCI/Cell-ID 1302 depicted in FIG. 13, as previously self-optimized to reduce power. Although the same transmission nodes 202a-222a are depicted in FIG. 14, the selected coverage area is depicted at a second, different point in time 1400. As time passes, the number and/or distribution of UEs can change significantly. For example, during the day, a geographic area with many offices can experience a low traffic load at night. Whereas during the day, the traffic load can be relatively high. At the second, different point in time 1400 depicted in FIG. 14, the number and distribution of UEs 1401a, 1401b has changed significantly.

The number of UEs within the coverage area 208b previously associated with high-power transmission node 208a has increased from four to fourteen. Similarly, the number of UEs within the coverage area 222b previously associated with LPN 222a has increased from one to three. The change in distribution can mean that the adjacent transmission nodes, such as transmission nodes 202a, 204a, 214a, 216a, and 218a, as discussed with respect to FIG. 9, can no longer provide coverage for cells that have been switched off. Therefore, it can become desirable to switch on transmission nodes/cells that were previously switched off in the formation of an SFN with a common Cell-ID.

Also, the number of UEs within the selected coverage area has increased from forty-four at the first time 200 to fifty-eight at the second time 1400. The increase in numbers of UEs can make the poor spectral efficiency of the SFN problematic for the increased capacity demands. Therefore, the higher capacity associated with the frequency reuse that could be made possible by splitting the SFN into new cells can become desirable.

For reasons such as those discussed above, one or more determinations can be made within a SON to switch on one or more transmission nodes/cells and/or to reconfigure certain transmission nodes/cells with different PCIs/Cell-IDs as traffic loads change, irrespective of whether the transmission nodes/cells with a common Cell-ID/PCI operate in SFN mode. Such determinations can be made at one or more transmission nodes (202a, 204a, 206a, 210a, 212a, 214a, 216a, and 218a) and/or the O&M module 232. To accomplish reconfiguration with one or more Cell-IDs, one or more sets of UEs can be handed over to, or reconfigured with respect to, different transmission nodes/cells with different Cell-IDs/PCIs.

Efficient handover and/or reconfiguration processes in response to such determinations can be accomplished with channel measurements for yet-to-be-configured PCIs/Cell-IDs. Such measurements for mobility management can be made on transmissions that can be indexed as originating from transmission nodes/cell for the yet-to-be-configured Cell-IDs. Such transmissions can be generated in ways similar to those discussed above. UEs can also be provided with information to allow them to index their measurements of such transmissions in ways similar to those discussed above.

For purposes of illustration and not limitation, such transmission and measurements are discussed here with respect to examples consistent with the 3GPP LTE standards. However, examples consistent with alternative standards are also possible with analogous implementations. In LTE consistent examples, UEs can make mobility management measurements comprising one or more RSRP/RSRQ measurements that can be indexed to yet-to-be-configured PCIs/Cell-IDs. To allow RSRP/RSRQ mobility management measurements to be indexed to yet-to-be-configured PCIs/Cell-IDs, they can be based on CSI-RSs that are generated to be so indexed in accordance with previous discussions.

As previously discussed with respect to FIG. 4 and FIG. 5, UEs can be provided with information allowing them to index mobility management measurements via RRC transmissions. For example, CSI-RS configuration information, from which transmission nodes/cells transmitting various CSI-RSs can be indexed to yet-to-be-configured PCIs/Cell-IDs can be communicated to UEs via one or more RRC transmissions. RRC transmission can minimize signaling overhead. However, other signaling methods, consistent with other examples, can also be used to indicate different sets of CSI-RS resources/configurations for mobility management measurements via dedicated RRC signaling if appropriate information regarding relative UE locations is available at the SON side.

The set of CSI-RS resources to be configured for RSRP/RSRQ mobility management measurements can be independent of a similar set of CSI-RS resources generated for CoMP Resource Management (CRM). The RSRP/RSRQ mobility management measurements can also be independent of similar measurements for CRM. Furthermore, RRC signaling supporting RSRP/RSRQ mobility management measurements can also be independent of any RRC signaling for RCM. Therefore, provision can be made with respect to CSI-RS generation, RRC signaling, and for RSRP/RSRQ measurements with respect to mobility management for yet-to-be-configured Cell-IDs separate and apart for any similar provision made for CRM for the 3GPP LTE standards for Release 11 and/or Releases beyond Release 11.

FIG. 15 depicts ASN1 source code for an IE for RRC signaling to indicate a set of different CSI-RS resources corresponding to yet-to-be-configured PCIs/Cell-IDs, for transmission nodes/cells that could be presently sharing the same Cell-ID, to support measurements for handover and mobility management with respect to those yet-to-be-configured Cell-IDs/PCIs. As can be appreciated, those of ordinary skill in the art can produce such CSI-RSs by alternative approaches. Additionally, those of ordinary skill in the art can generate alternative, non-CSI-RS related approaches, both consistent with LTE and other standards.

Measurements for mobility management can often be made by UEs in neighboring coverage areas that are not subjected to reconfiguration. Irrespective of whether a new PCI/Cell-ID is configured for multiple transmission nodes/cells in an SFN or whether new PCIs/Cell-IDs are configured to break up a common PCI/Cell-ID, a change in PCI/Cell-ID is involved. For UEs connected to a reconfigured cell with a new PCI/Cell-ID, the new PCI/Cell-ID can be provided in a handover command message or during reconfiguration of those UEs for the new PCI/Cell-ID. However, UEs connected to neighboring cells may also need information about the reconfigured PCI/Cell-ID for purposes of mobility management.

Such UEs can perform channel measurement on neighboring transmission nodes/cells that can be used to make determinations about cells. When the neighboring transmission nodes/cells are to be reconfigured, UEs can require information about when the cell with this new PCI/Cell-ID is started and the cell with the old PCI/Cell-ID is no longer available for the neighboring measurement.

In certain examples, a transmission node/cell, e.g., high-power transmission node 208a, can notify other neighboring transmission nodes of the impending change of PCI/Cell-ID. The notification can take place via a reconfiguration message, which in some examples can be an X2 message, over the lattice of backhaul communication links 224 similar to the one depicted in FIG. 2. The reconfiguration message, can include the old PCI/Cell-ID, the new PCI/Cell-ID, and/or the timing when the reconfiguration will be effective. Similar information can be provided to the O&M module 232 and/or from the O&M module over CN communication links 226 similar to those depicted in FIG. 2.

Upon receipt of the reconfiguration message, a neighboring cell can reconfigure a neighboring cell list maintained by the cell. By way of example and not limitation, in examples consistent with the 3GPP LTE standard, a MeasObject-EUTRA Information Element can be used to remove the old PCI/Cell-ID and to add the new PCI/Cell-ID. To disseminate this information to the UEs in the coverage area of the neighboring transmission node/cell, in examples consistent with the 3GPP LTE standard, the neighboring transmission node/cell can transmit information from the reconfiguration message to connected mode UEs in the coverage area via dedicated RRC signaling. With respect to idle mode UEs, the neighboring transmission node/cell can update SIB 4 and/or SIB 5 with information from the reconfiguration message.

As can be appreciated, if there are many UEs in a neighboring coverage area that would perform mobility measurements on a transmission node/cell to be reconfigured, the large number of RRC signaling messages can lead to significant signaling overhead. To reduce overhead and to accomplish signaling more efficiently, instead of dedicated RRC signaling, a neighboring transmission node/cell can broadcast information for changes in one or more Cell-IDs/PCIs, even for connected mode UEs. Such broadcast information can provide information about a set of PCIs/Cell-IDs to be removed and a set of new PCIs/Cell-IDs to be added, potentially together with timing information. Where the relationship between old PCIs/Cell-IDs and new PCIs/Cell-IDs is included in the broadcast information, in examples consistent with the 3GPP/LTE standards, other parameters like the cell index and cell offset can be reused for the new PCIs/Cell-IDs. With mobility management issues addressed, reconfiguration can proceed.

Figure 16:
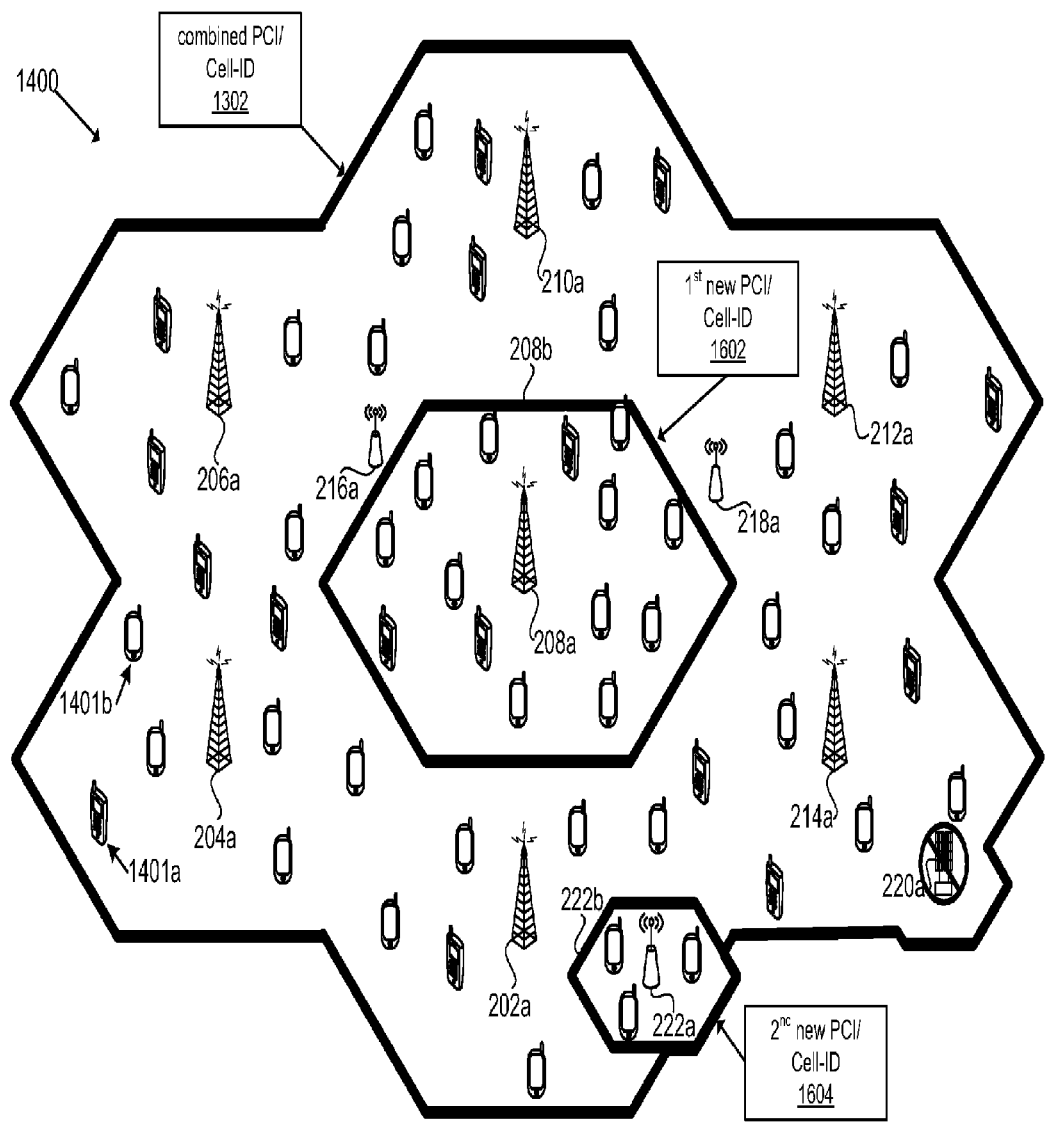
FIG. 16 is a block diagram illustrating the formation of two new PCIs/Cell-IDs from and in addition to the remaining common PCI/Cell-ID to increase capacity and to accommodate redistributions of load traffic.

FIG. 16 depicts the formation of two new PCIs/Cell-IDs (1602 and 1604) in addition to the remaining common PCI/Cell-ID 1302 to accommodate a changed traffic load across the selected coverage area at the second time 1400. The same transmission nodes 202a-222a are depicted in FIG. 16 as are depicted in FIG. 2. However, the selected coverage area is depicted at a second point in time 1400, as also depicted in FIG. 13, as opposed to the first point of time 200 depicted in FIG. 2. As a result, the number and distribution of UEs 1401a, 1401b is the same as in FIG. 13, but not as in FIG. 2, FIG. 3, FIG. 4, and FIG. 7.

In certain examples, LPN 222a can simply be switched on, sharing a PCI/Cell-ID with an associated high-power transmission node. However, in alternative examples, the increased flexibility provided by approaches discussed above can allow such an LPN to receive its own PCI/Cell-ID, or become associated with new transmission nodes/cells receiving a new PCI/Cell-ID. Although the first and second new PCIs/Cell-IDs each include only a single transmission node, in several consistent examples, new PCIs/Cell-IDs can be formed with multiple transmission nodes/cells. Since the first new PCI/Cell-ID 1602 and the second new PCI/Cell-ID 1604 can be distinctly identified within the selected coverage area 1400, one or more of them can increase spectral efficiency by operating at frequencies that are distinct from others used in the selected coverage area. As can be appreciated, RRH 220a remains switched off.

Although most of the UEs are still associated with the common PCI/Cell-ID 1302 configured to save energy, many UEs are associated with the first new PCI/Cell-ID 1602 or the second new PCI/Cell-ID 1604, i.e., those UEs within the respective coverage areas (208b and 222b) for the first and second new PCIs/Cell-IDs.

Since the first new PCI/Cell-ID 1602 and the second new PCI/Cell-ID 1604 can be distinctly identified within the selected coverage area 1400, one or more of them can increase spectral efficiency by operating at portions of the spectrum that are distinct from others used in the selected coverage area to increase capacity within the selected coverage area 1400. Switching on the high-power transmission node 208a associated with the first new PCI/Cell-ID and the LPN associated with the second new PCI/Cell-ID can address the increased density within the respective coverage areas (208b and 222b). As can be appreciated, RRH 220a can remain switched off to save energy. After the first new PCI/Cell-ID and the second new PCI/Cell-ID have been reconfigured, additional optimization can be achieved through antenna tilting.

Energy saving and load capacity are not the only parameters that the supporting approaches to channel measurements and mobility management can assist in providing increased flexibility for optimizations. Mobility can also be a parameter for optimization. For example, mobility can play a role in achieving the desirable condition of a balanced load among transmission nodes/cells. A balanced load can improve system capacity. Achieving a balanced load can entail distributing load evenly among transmission nodes/cells, i.e., transferring part of the traffic load from congested cells. These distributions and transfers rely on mobility. Optimization of mobility parameters and/or or handover actions, therefore, can facilitate load balancing. Additionally, optimization of mobility can significantly reduce overhead where UEs frequently are re-associated with new transmission nodes/cells. Furthermore, general improvements that can arise from self-optimization with respect to mobility can also minimize human interventions in network management and optimization tasks.

Support for mobility load balancing can consist of functions such as: load reporting, as discussed previously; load balancing actions, such as those based on handovers; and/or adapting handover and/or reselection configurations. One new example of adapting handover and/or reselection configurations can involve dynamic PCI/Cell-ID configurations relying on the increased flexibility offered by approaches discussed above. By enabling dynamic PCI/Cell-ID configuration for different transmission nodes/cells, whether high or low power, load balancing and mobility can be further enhanced.

Figure 17:
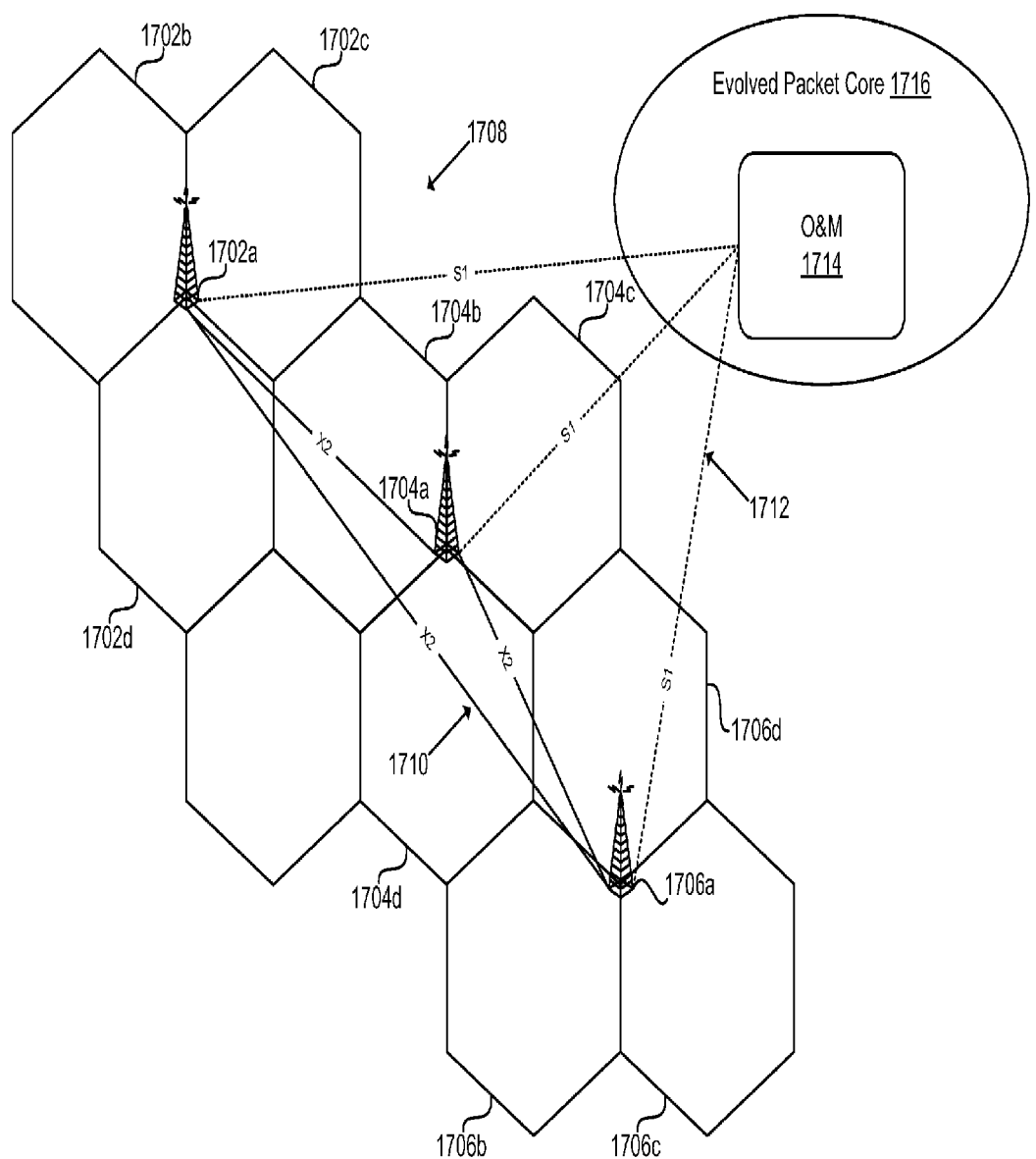
FIG. 17 is a block diagram illustrating details for communication infrastructure enabling self-optimization determinations within an exemplarily wireless network.

FIG. 17 depicts an environment where dynamic PCI/Cell-ID re-configuration can make use of increased flexibility, as described above, to further enhance mobility and load balancing. A series of transmission nodes 1702a, 1704a, and 1706a within a portion of an SON 1708 are depicted. Associated with each transmission node are three hexagonal coverage regions. More specifically, hexagonal coverage regions 1702b, 1702c, and 1702d, arranged clockwise around transmission node 1702a are associated with that transmission node. Also, hexagonal coverage regions 1704b, 1704c, and 1704d, arranged clockwise around transmission node 1704a are associated with that transmission node. Furthermore, hexagonal coverage regions 1706b, 1706c, and 1706d, arranged counter clockwise around transmission node 1706a are associated with that transmission node.

A lattice of backhaul communication links 1710 between the series of transmission nodes 1702a, 1704a, and 1706a is also depicted. As with FIG. 2, the lattice of backhaul communication links can comprise X2 interfaces, but other backhaul links are possible. Additionally, CN communication links 1712 are depicted. As with FIG. 2, these CN communication links can comprise S1 interfaces, but other types of communication links are possible. The CN communication links can allow the one or more transmission nodes to communicate with the O&M module 1714 in a CN 1716, such as an EPC.

Figure 18:
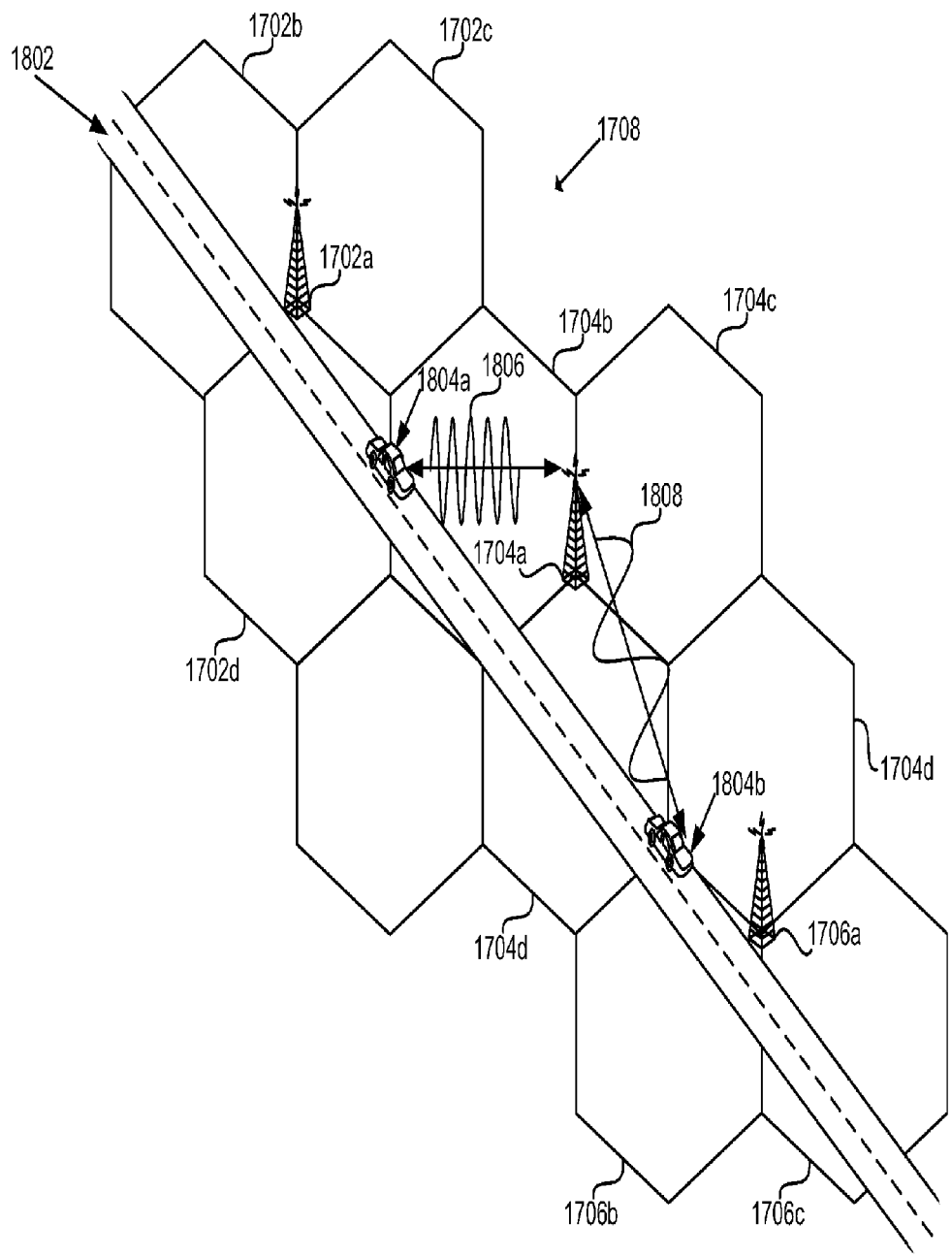
FIG. 18 is a block diagram illustrating the use of the Doppler effect to measure the speed at which a UE is traveling in a car driving through the wireless network.

FIG. 18 depicts a thoroughfare 1802 traversing the portion of the SON 1708, together with the measurement of the speed of a UE based on the Doppler effect. The same portion of the SON 1708 is depicted with the same series of transmission nodes 1702a, 1704a, and 1706a and respective corresponding hexagonal coverage regions 1702b-1702d, 1704b-1704d, and 1706b-1706d. The thoroughfare 1802 traversing the portion of the SON can be a road, highway, freeway, railway, or the like.

Also depicted is a car at a first time 1804a and a second time 1804b as it travels down the thoroughfare 1802. A UE within the car (not depicted) can be in a connected mode with transmission node 1704a. As can be appreciated, a known signal transmitted between the UE within the car at the first time and transmission node 1704a will be shifted up in frequency according to the speed of the UE, due to the Doppler effect. Conversely, a known signal transmitted between the UE within the car at the second time and transmission node 1704a can be shifted down in frequency. This shift in frequency can be used, at the UE, a transmission node, and/or the O&M module 1714 to determine the speed of the UE. Measurements of UE speed can be used to make decisions for dynamic PCI/Cell-ID re-configurations to a high mobility Cell-ID configuration or a high load capacity configuration.

Figure 19:
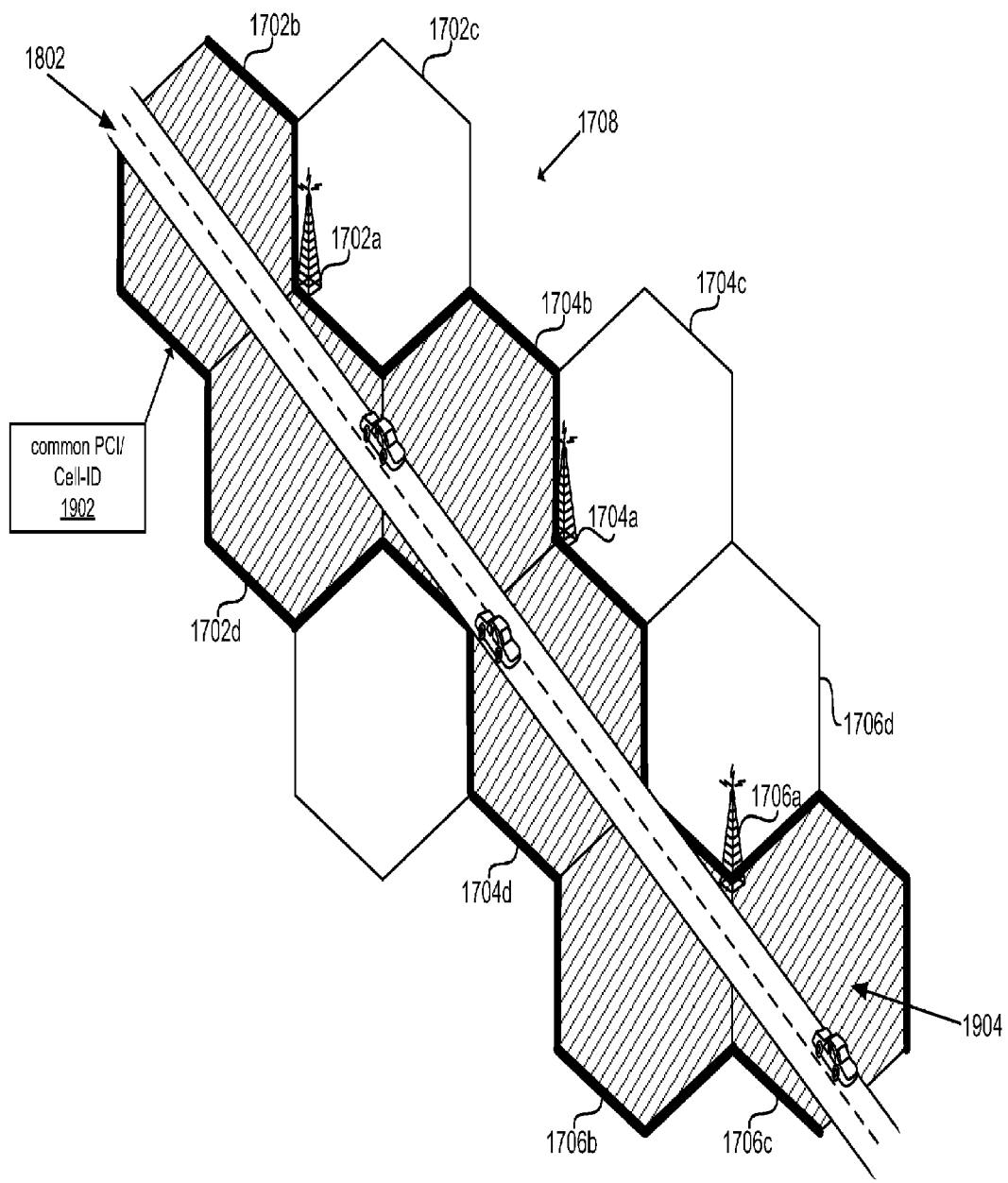
FIG. 19 is a block diagram illustrating the assignment of a common PCI/Cell-ID across multiple portions of the additional network in an area of the additional network with low traffic loads and high speeds along an uncongested roadway to self-optimize the network for high mobility with low handover overhead.

FIG. 19 provides an example where a determination has been made to assign a common PCI/Cell-ID across multiple hexagonal coverage regions (1702b, 1702d, 1704b, 1704d, 1706b, and 1706d) of the portion of the SON 1708 for a high mobility Cell-ID configuration. Again, the same portion of the SON 1708 is depicted with the same series of transmission nodes 1702a, 1704a, and 1706a and respective corresponding hexagonal coverage regions 1702b-1702d, 1704b-1704d, and 1706b-1706d. The thoroughfare 1802 is depicted as a two-lane highway with uncongested traffic, as indicated by the three cars spaced at significant distances from one another.

Because of the lack of traffic, UEs within cars traveling along the two-lane highway 1802 can travel at speeds that can result in frequent handovers and/or changes in PCI/Cell-ID configurations. The lack of traffic also results in a low number of UEs and a low load associated therewith. Times during which the two-lane highway is uncongested can be considered as off-peak. During off-peak times, the throughput requirement is low. However, handover demands can be high, as cars travel at high speed.

A determination can be made at one or more transmission nodes (1702a, 1704a, and 1706a) and/or the O&M module 1714 that off-peak and/or uncongested traffic conditions obtain. The determination can be made based on one or more of several considerations. Examples of such considerations can include, by way of example and not limitation: a speed measurement, such as measurements described with respect to the preceding figure; a time of day; a day of the week; an event likely to affect traffic conditions along the thoroughfare 1802; and/or traffic load measurements. Load information and other information pertaining to the previously discussed considerations, such as average user speed estimated at a transmission node, can be shared among transmission nodes. This information can be shared over the lattice of backhaul communication links 1710 and/or CN communication links 1712.

Once a determination has been made that off-peak and/or uncongested traffic conditions obtain, a determination can also be made at one or more transmission nodes (1702a, 1704a, and 1706a) and/or the O&M module 232 to reduce overhead associated with transitions by UEs between transmission nodes/cells by combining transmission nodes/cells to share a common PCI/Cell-ID 1902. Similarly one or more determinations can be made about what transmission nodes/cells to include within the common PCI/Cell-ID 1902 based on considerations such as those discussed above. In FIG. 19, transmission nodes/cells sharing the common PCI/Cell-ID comprise coverage areas (1702b, 1702d, 1704b, 1704d, 1706b, 1706c) indicated by the bold outline and the diagonal cross-hatching. Depending on the example, the common PCI/Cell-ID can be configured as an SFN, but examples not configured as an SFN are also consistent.

Once a determination has been made to implement a common PCI/Cell-ID 1902, one or more transmission nodes 1702a, 1704a, and 1706a and/or the O&M module 1714 can send a handover commend and/or trigger, specifying the handover delay for the UEs associated with the old cell. One or more transmission nodes and/or the O&M module can reconfigure the common PCI/Cell-ID. They can also address UE handover to the new PCI/Cell-ID.

A determination to reconfigure transmission nodes/cells through which the thoroughfare 1802 passes can be proceeded by measurements, as described above, of the common PCI/Cell-ID 1902 before it is configured to insure adequate coverage. Additionally, any reconfiguration of PCI/Cell-ID and/or handover for UEs, can be addressed as discussed above. Measurements that can be used for mobility management during and/or after reconfiguration of the common PCI/Cell-ID are also discussed above. The three transmission nodes 1702a, 1704a, and 1706a depicted in FIG. 19 are depicted as high-power transmission nodes, such as MCN eNodeBs, but examples can also include low-power nodes, such as LPNs, and various numbers of transmission nodes can be involved. The high-power transmission nodes illustrate the way in which the examples are not limited to traditional approaches based on switching on or off capacity boosters because of the flexibility provided by additional supporting technologies disclosed herein.

In some examples, such as the one depicted in FIG. 19, spatial multiplexing methods, such as beam forming, can be used to include certain cells for coverage areas, such as 1702b and 1702d, associated with a common transmission node, such as transmission node 1702a, and through which the thoroughfare 1802 passes, while not including other cells for coverage areas, such 1702c, also associated with the transmission node. Different PCIs/Cell-IDs can be assigned to different CCs at transmission nodes for this purpose. In other examples, all cells and their corresponding coverage associated with a transmission node can be included in the common PCI/Cell-ID 1902. By configuring transmission nodes/cells with corresponding coverage areas to have a common PCI/Cell-ID, significant reductions in mobility overhead can be achieved.

Although mobility can be improved with the configuration of a common PCI/Cell-ID 1902, improvements can come at the cost of lower throughput. Due, for example, to the dynamic nature of highway traffic, it can be beneficial to adaptively configure portions of the network along a thoroughfare 1802. For example, during a period of high traffic, a lot of cars are congested in a highway. At such a time, higher throughput may be required due to the increased number of UEs in those cars. Additionally, due to the low speeds of those cars, mobility issues, such as handover performance, may be less of an issue. Furthermore, at such a time, it may be desirable to have different transmission nodes/cells configured with different PCIs/Cell-IDs to increase spectrum reuse and, hence, total throughput.

Figure 20:
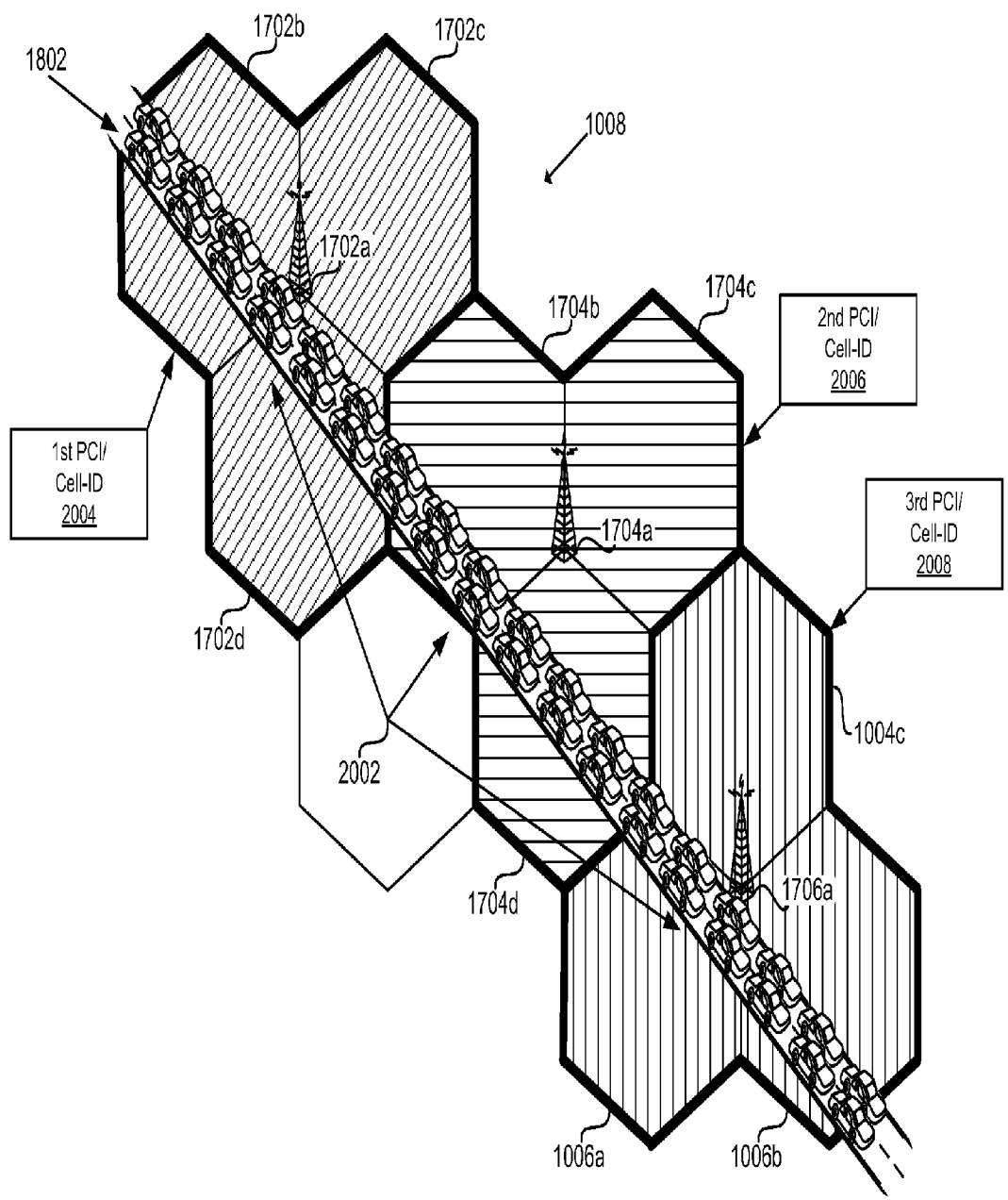
FIG. 20 is a block diagram illustrating the assignment of different frequencies and PCIs/Cell-IDs to different transmission nodes/cells in the exemplary wireless network in an area of the additional network with high traffic loads and low speeds along an congested roadway to self-optimize the network for high spectral efficiency and carrying capacity.

FIG. 20 depicts the assignment of different PCIs/Cell-IDs to different transmission nodes in the additional network in an area of the additional network with high traffic loads and low speeds along a congested roadway 1802 to form a high load capacity configuration. Again, the same portion of the SON 1708 is depicted with the same series of transmission nodes 1702a, 1704a, and 1706a and respective corresponding hexagonal coverage regions 1702b-1702d, 1704b-1704d, and 1706b-1706d. However, the thoroughfare 1802 is now depicted as a two-lane highway with a high degree of congested traffic 2002, as indicated by the large number cars situated bumper-to-bumper.

Also, the transmission nodes/cells sharing the common PCI/Cell-ID 1902 have each been given their own PCI/Cell-ID. Transmission node 1702a has been assigned the $1^{st}$ PCI/Cell-ID 2004 spanning hexagonal coverage regions 1702b-1702d. Transmission node 1704a has been assigned the $2^{nd}$ PCI/Cell-ID 2006 spanning hexagonal coverage regions 1704b-1704d. Also, transmission node 1706a has been assigned the $3^{rd}$ PCI/Cell-ID 2008 spanning hexagonal coverage regions 1706b-1706d. The geographic areas corresponding to the various PCIs/Cell-IDs are depicted as enclosed within the bold boundary lines. The different PCIs/Cell-IDs can be used to increase throughput, capacity, and/or quality of service by operating at different portions of the spectrum in the different PCIs/Cell-IDs. Although each transmission node receives a different PCI/Cell-ID in FIG. 20, multiple transmission nodes can share a new PCI/Cell-ID in various examples.

Again, a determination to reconfigure one or more common PCIs/Cell-IDs into a larger number of PCIs/Cell-IDs can be proceeded by measurements, as described above, before the larger number of common PCIs/Cell-IDs, such as the $1^{st}$ PCI/Cell-ID 2004, the $2^{nd}$ PCI/Cell-ID, and the $3^{rd}$ PCI/Cell-ID 2008, are configured. For example, and not by way of limitation, one or more transmission nodes 1702a, 1704a, and 1706a and/or the O&M module 1714 can instruct one or more UEs to do RSRP/RSRQ measurements on CSI-RSs indexed to the yet-to-be-configured PCIs/Cell-IDs. Such measurements can be used, for example, to insure coverage and for handover preparation.

Additionally, any reconfiguration of PCI/Cell-ID and/or handover for UEs, can be addressed as discussed above. For example, and not by way of limitation, one or more transmission nodes and/or the O&M module can send a handover commend and/or trigger and specify the handover delay for the UEs associated with the old cell. Measurements that can be used for mobility management during and/or after reconfiguration of the common PCI/Cell-ID are also discussed above. One or more transmission nodes and/or the O&M module can reconfigure one or more common PCIs/Cell-IDs into a larger number of PCIs/Cell-IDs.

Figure 21:
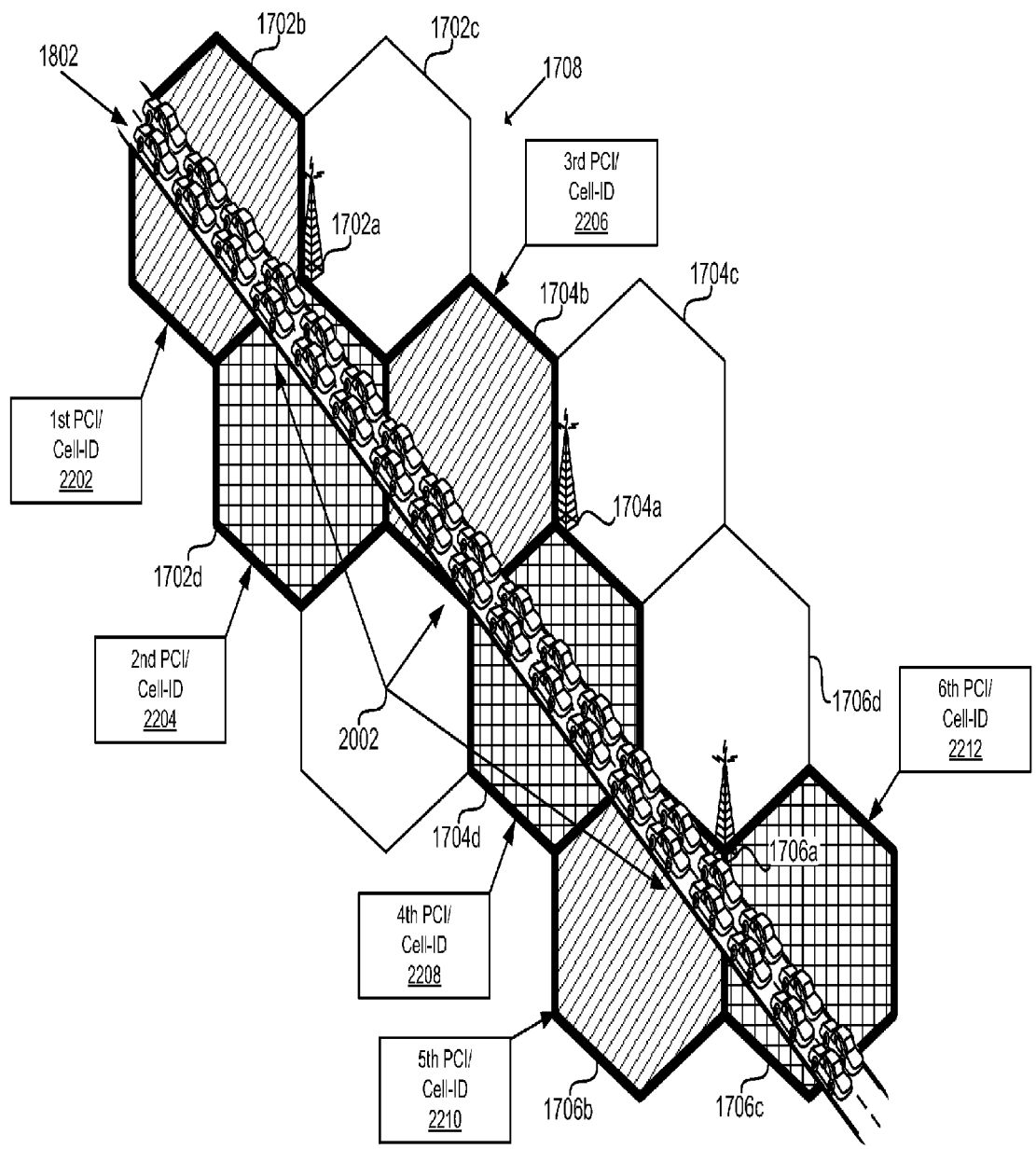
FIG. 21 is a block diagram illustrating the assignment of multiple different frequencies and PCIs/Cell-IDs to individual transmission nodes/cells by means of spatial multiplexing to further increase spectral efficiency and carrying capacity in an area of the additional network along the congested roadway.

FIG. 21 also depicts reconfiguration to a larger number of PCIs and/or Cell-IDs. Yet again, the same portion of the SON 1708 is depicted with the same series of transmission nodes 1702a, 1704a, and 1706a and respective corresponding hexagonal coverage regions 1702b-1702d, 1704b-1704d, and 1706b-1706d. Also, the thoroughfare 1802 again depicted as a two-lane highway with a high degree of congested traffic 2002, as indicated by the large number cars 2002 situated bumper-to-bumper.

However, the number of new PCIs/Cell-IDs has been increased from three to six (2202, 2204, 2206, 2208, 2210, and 2212). Increased numbers of PCIs/Cell-IDs can be accomplished by spatial multiplexing methods, such as beam forming. The increased number of PCIs/Cell-IDs can also lead to increased spectral frequency and capacity through increased use of different portions of the spectrum, as indicated in FIG. 21 by the alternating shading pattern. In some examples, additional advanced techniques, such as COMP can be used.

Examples can also be depicted as methods. Such methods can be depicted with functional blocks. These functional blocks can depict steps, or operations, consistent with examples of such methods. Depending on the example, such steps, or operations, can be implemented, but need not necessarily be implemented, in computer readable program code stored on a non-transitory computer usable medium. Although functional blocks can be depicted in order, the order in which they are depicted can, in many instances, be changed. Indeed, certain functional blocks can be performed simultaneously. Throughout this application, the order in which the functional blocks are depicted, therefore, does not necessarily indicate a chronological order in which the corresponding steps, or operations, are necessarily performed. Several additional methods not depicted can also be consistent with additional examples.

Figure 22:
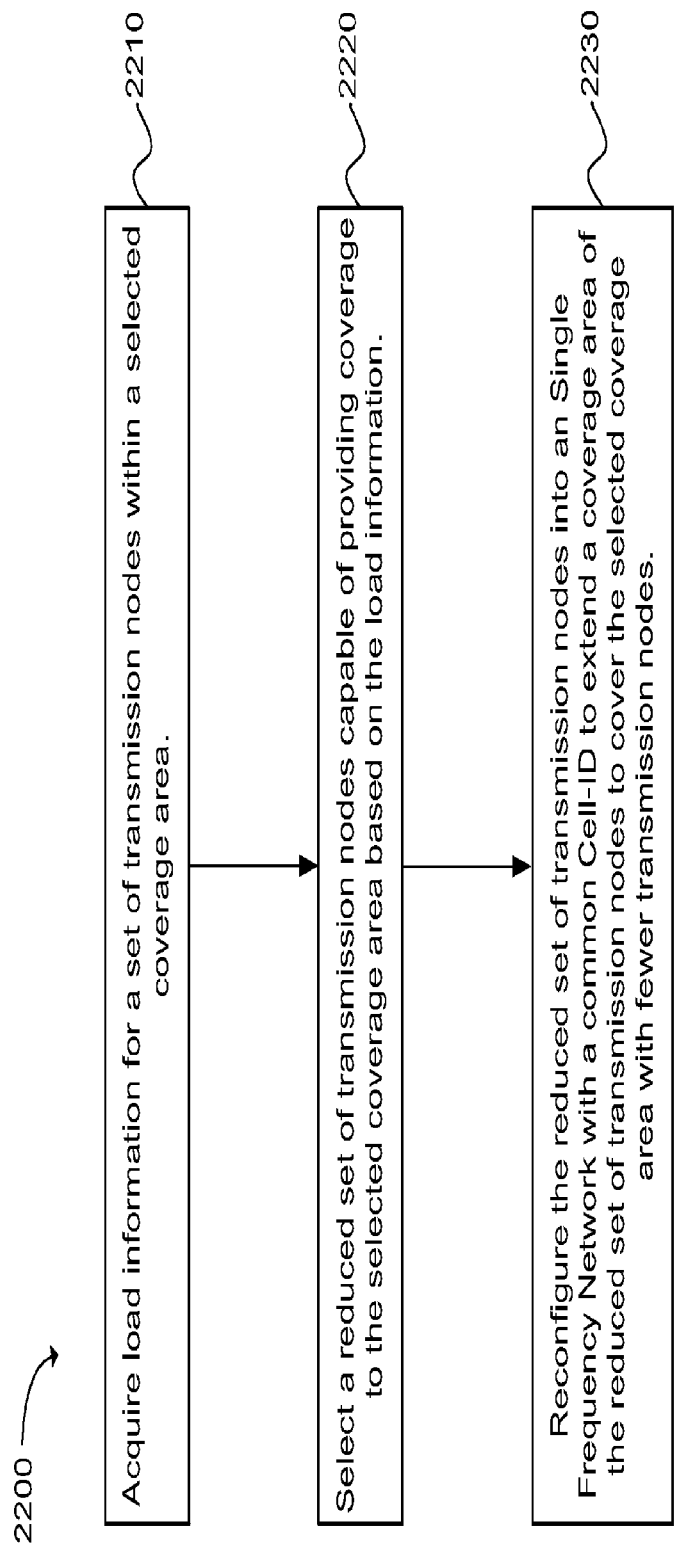
FIG. 22 is a flowchart depicting a process for self-optimizing a wireless network with respect to energy, in accordance with an example.

FIG. 22 depicts functional blocks representative of a method 2200 for forming a Single Frequency Network (SFN). The method can be implemented on an eNodeB and/or the O&M module located within an Evolved Packet Core (EPC). The method 2200 can comprise acquiring 2210 load information for a set of transmission cells within a selected coverage area. A reduced set of transmission cells capable of providing coverage to the selected coverage area can be selected 2220 based on the load information. The reduced set of transmission cells can be reconfigured 2230 into an SFN with a common Cell-Identification (Cell-ID). The reduced set of transmission cells can be reconfigured into the SFN with the common Cell-ID to extend a coverage area of the reduced set of transmission cells to cover the selected coverage area with fewer transmission cells. The step of reconfiguring 2230 the set of transmission cells can comprise sending commands to the set of reconfiguration nodes to accomplish reconfiguration.

The method 2200 can further comprise sending a CSI-RS to a plurality of User Equipments (UEs) within the selected coverage area for a yet-to-be-configured common Cell-ID. A set of measurements from the plurality of UEs based on the CSI-RS can then be received. The set of measurements can be used to select the reduced set of transmission cells and to determine that the reduced set of transmission cells will maintain coverage for the selected coverage area after being configured with the common Cell-ID.

In certain examples, the method can first comprise compiling the set of transmission cells by including adjacent transmission cells with a light traffic load in the set of transmission cells. Depending on the example, the load information is acquired from one of at least one of an S1 transport network layer load and at least one Relative Narrowband Transmission Power (RNTP) message. The RNTP message can be communicated via an X2 connection between transmission cells. Some examples can comprise adjusting antenna tilting to optimize coverage for a resultant coverage scenario arising after reconfiguring the remaining set of transmission cells into the SFN with the common Cell-ID.

Examples can also further comprise determining that one or more additional transmission cells would improve handling of an increased traffic load within the selected coverage area. The determination can be made based on the load information. The improved handling can be achieved by increasing spectral efficiency for the increased traffic load. Such examples can also comprise reconfiguring the one or more additional transmission cells with at least one new Cell-ID. A handover can be performed for one or more UEs to the at least one additional transmission cell.

Examples in which a determination is made that one or more additional transmission cells would improve handling can further comprise requesting at least one CSI-RS based measurement to determine the one or more additional transmission cells, where a CSI-RS for the at least one CSI-RS based measurement carries information that can be correlated to a yet-to-be-configured Cell-ID. Such examples can also further comprise requesting at least one CSI-RS based measurement after the at least one additional transmission cell has been reconfigured with one or more new Cell-IDs. The additional request can be made to provide channel information for the one or more Cell-IDs.

Figure 23:
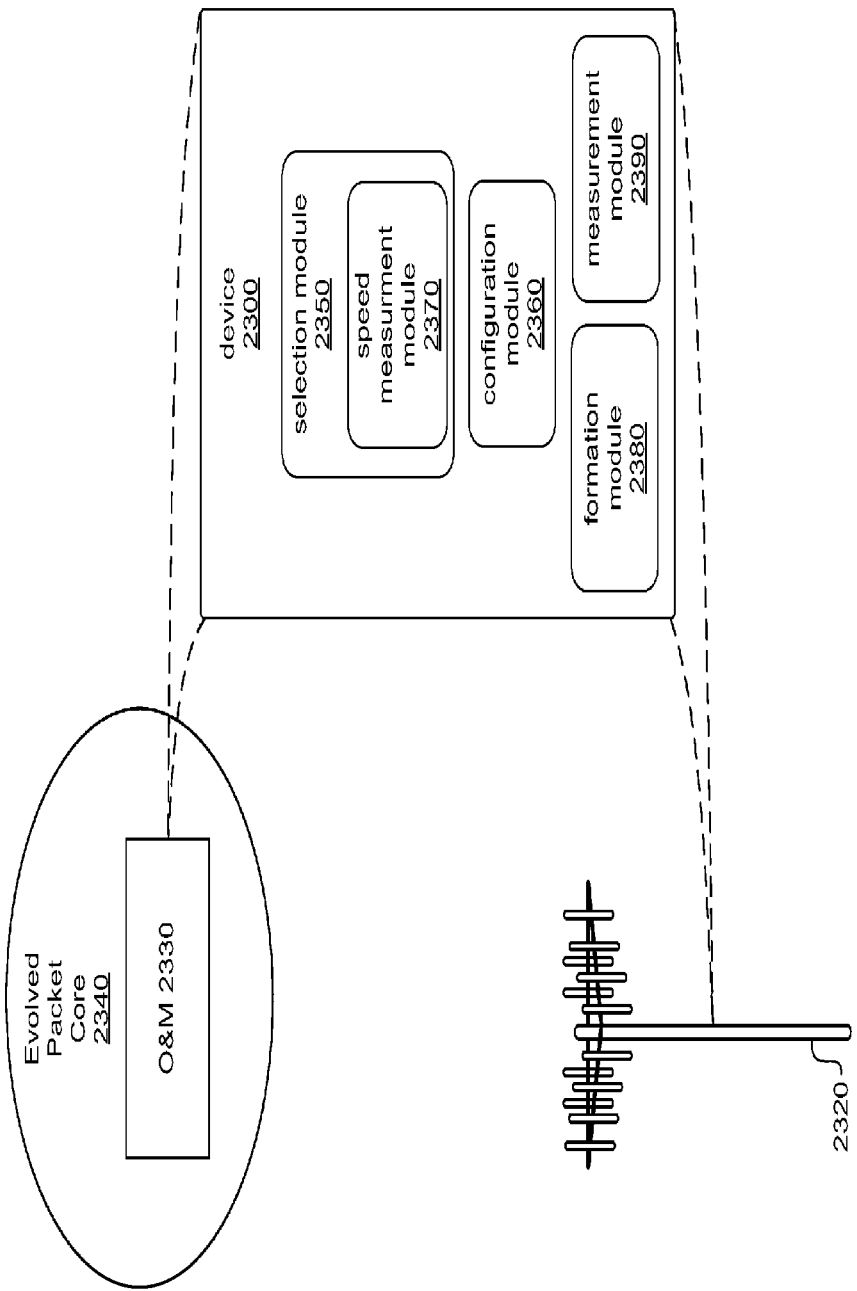
FIG. 23 is a block diagram illustrating a device to self-optimize a wireless network to balance mobility overhead and load requirements, in accordance with an example.

FIG. 23 depicts a device 2300 that can reside on an eNodeB 2320 and/or the O&M module 2330 located within an EPC 2340. The device 2300 can be configured for balancing mobility overhead and load requirements on a wireless communication system. The device 2300 can further comprise a selection module 2350 and a configuration module 2360.

The selection module 2350 can be configured to select, for a set of transmission cells, one of a high mobility Cell-ID configuration and a high load capacity Cell-ID configuration. The configuration module 2360 can be in communication with the selection module. The configuration module can be configured to configure the set of transmission cells to operate in the high mobility Cell-ID configuration. The high mobility Cell-ID configuration can comprise an SFN with a common Cell-ID to reduce mobility overhead. Additionally, the configuration module can configure the set of transmission cells to operate in the high load capacity configuration. The high load capacity configuration can have multiple transmission cells with different cell-IDs, to allow increased spectral efficiency for an increased load.

Certain examples can further comprise a speed measurement module 2370, which can be in communication with the selection module 2350. The speed measurement module can be configured to perform at least one speed measurement for a set of UEs within the selected coverage area for the set of transmission cells. The speed measurement module can also be configured to communicate the at least one speed measurement to the selection module. In some examples, the selection module can use one or more speed measurements and/or load information to select, for the set of transmission cells, one of the high mobility Cell-ID configuration and the high load capacity Cell-ID configuration.

In some of such examples, the selection module 2350 can select, for the set of transmission cells, one of the high mobility Cell-ID configuration and the high load capacity Cell-ID configuration. The selection can based on a combined value relative to a configuration threshold. The combined value can include weighted speed values and weighted load values. In such examples, higher weighted speed values can push the combined value toward values relative to the configuration threshold indicative of the high mobility Cell-ID configuration. Additionally, higher weighted load values can push the combined value toward values relative to the configuration threshold indicative of the high load capacity Cell-ID configuration.

In certain examples, the selected coverage area for the set of transmission cells can span a length of a thoroughfare. The thoroughfare can be designated for vehicular traffic and/or railway traffic. In some examples, the selection module 2350 can use time of day information, day of the week information, holiday information, and/or event information to select one of the high mobility Cell-ID configuration and the high load capacity Cell-ID configuration.

Some examples can also comprise a formation module 2380. The formation module 2380 can be configured to receive load information and/or one or more speed measurements from multiple transmission cells. Additionally, the formation module can be configured to compile the set of transmission cells by including a given transmission cell in the set of transmission cells where the given transmission cell is adjacent to a transmission cell already included in the set of transmission cells. Such transmission cells can be included where the load information and/or one or more speed measurements has a corresponding set of values within a value range predefined for the set of transmission cells.

Certain examples can also comprise a measurement module 2390. The measurement module can be configured to send a set of CSI-RSs for yet-to-be-configured Cell-IDs to a plurality of UEs within a selected coverage area of the set of transmission cells. Furthermore, the measurement module can receive a set of measurements from the plurality of UEs based on the set of CSI-RSs. The set of measurements can be used to assist in handover of the plurality of UEs where the selection module 2350 changes a selection from a high mobility Cell-ID configuration to a high load capacity Cell-ID configuration.

Figure 24:
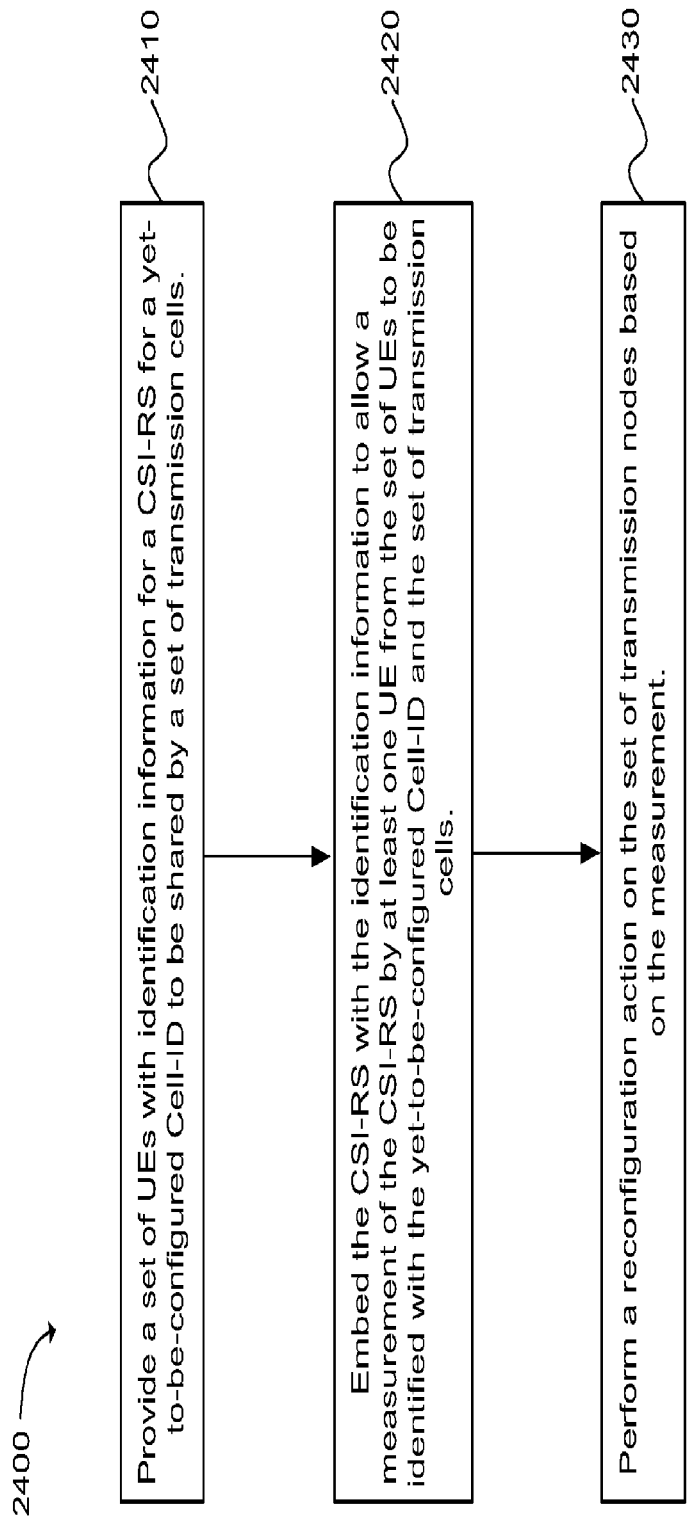
FIG. 24 is a flowchart depicting a process for generating CSI-RSs for yet-to-be configured PCIs/Cell-IDs, in accordance with an example.

FIG. 24 depicts functional blocks representative of a method 2400 for implementing CSI-RSs for yet-to-be-configured Cell-IDs. The method can be implemented on an eNodeB and/or the O&M module located within an EPC. The method can comprise providing 2410 a set of UEs with identification information for a CSI-RS for a yet-to-be-configured Cell-ID to be shared by a set of transmission cells. The CSI-RS can be embedded 2420 with the identification information to allow a measurement of the CSI-RS by at least one UE from the set of UEs to be identified with the yet-to-be-configured Cell-ID and the set of transmission cells. A reconfiguration action can be performed 2430 on the set of transmission cells based on the measurement.

Performing 2430 the reconfiguration action, in some examples, can further comprise receiving measurements from the set of UEs. Additionally, such examples can comprise estimating a potential coverage area, based on the set of measurements, for a potential new SFN with a common Cell-ID. In such examples, at least a subset of the set of transmission cells can be designated for the potential new SFN.

For certain examples, performing 2430 the reconfiguration action can further comprise receiving measurements from the set of UEs. Additionally, this step can comprise determining, based on the measurements, at least one target transmission cell within the set of transmission cells for at least one new Cell-ID. In some examples, embedding 2420 the CSI-RS with the identification information can further comprise assigning an identification value to the yet-to-be-configured Cell-ID.

Embedding the CSI-RS with the identification information can also comprise replacing a Cell-ID value with the identification value to generate a pseudo random sequence for the CSI-RS that can identify the yet-to-be-configured Cell-ID. In such examples, the identification information can be embedded in an initializing portion of the CSI-RS. Additionally, providing 2410 a set of UEs with identification information can further comprise broadcasting the identification information via RRC broadcasting to a geographic area covered by the yet-to-be-configured Cell-ID.

Figure 25:
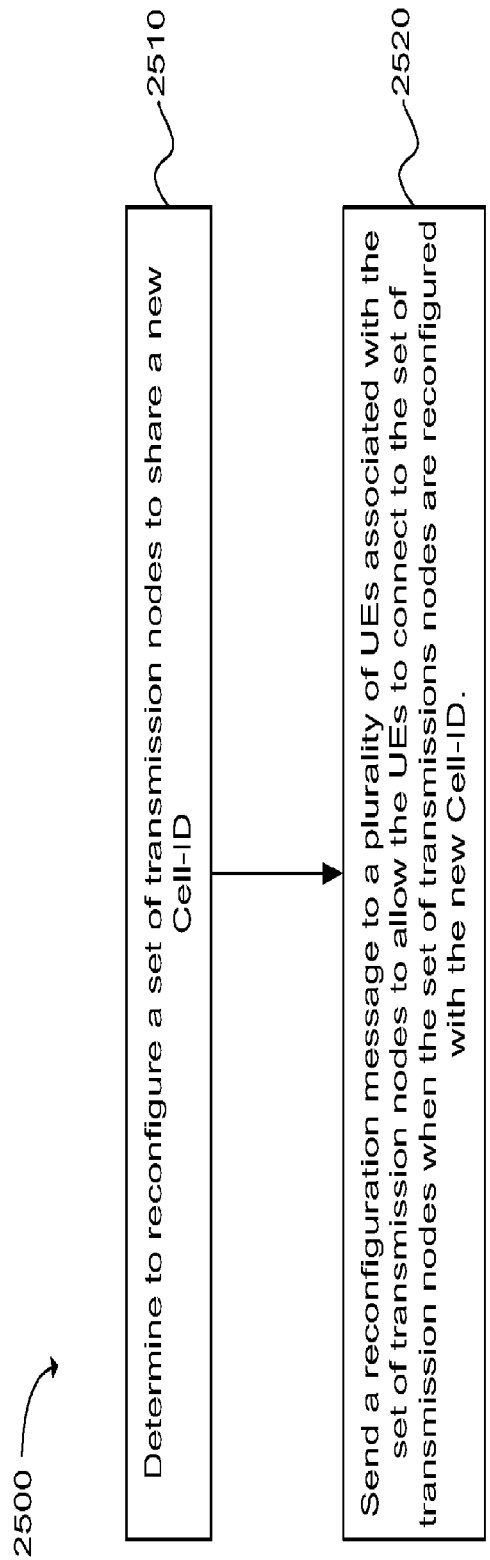
FIG. 25 is a flowchart depicting a process for UE handover with respect to a set of transmission nodes/cells to be reconfigured with respect to their identification information.

FIG. 25 depicts functional blocks representative of a method 2500 to connect UEs to a set of transmission cells to be reconfigured with a new Cell-ID. The method can be implemented on an eNodeB and/or the O&M module located within an EPC. The method can comprise determining 2510 to reconfigure a set of transmission cells to share a new Cell-ID. Additionally, the method can comprise sending 2520 a reconfiguration message to a plurality of UEs associated with the set of transmission cells. The reconfiguration message can be sent to allow the UEs to connect to the set of transmission cells when the set of transmissions nodes are reconfigured with the new Cell-ID to form a Single SFN.

In certain exemplary examples, the reconfiguration message can comprise an indication for the plurality of UEs to stop transmission, a value of the new Cell-ID, and/or a corresponding time when the new Cell-ID will be operational. The reconfiguration message can be configured to enable the plurality of UEs receiving the reconfiguration message to stop receiving and transmitting data. Receiving and transmitting data can be stopped by the reconfiguration message until a time when the new Cell-ID is operational and it is possible for the plurality of UEs to reconnect to the set of transmission cells with the new Cell-ID.

In some examples, the reconfiguration message can comprise a common handover command message sent to the plurality of UEs via multicast signaling. The common handover command can provide parameters that can be used to perform a handover for the plurality of UEs to the reconfigured set of transmission cells with the new Cell-ID. In some examples, the common handover command message can comprise one or more C-RNTIs and one or more target transmission cell security algorithm identifiers. The common handover command message can also comprise a dedicated RACH and/or target eNodeB system information. In certain examples, the method 2500 can further comprise sending a different handover command to specify a handover delay for the plurality of UEs associated with the set of transmission cells.

Certain examples can further comprise providing a notification message to at least one neighbor transmission cell adjacent to a reconfigured transmission cell within the set of transmission cells. The notification message can include an original Cell-ID, a reconfigured Cell-ID; and/or information about when the reconfigured Cell-ID will be operable for the reconfigured transmission cell. Also, in some examples, the reconfiguration message can indicate that a time when the common Cell-ID will be operational is in a next System Information Block (SIB) modification period.

Figure 26:
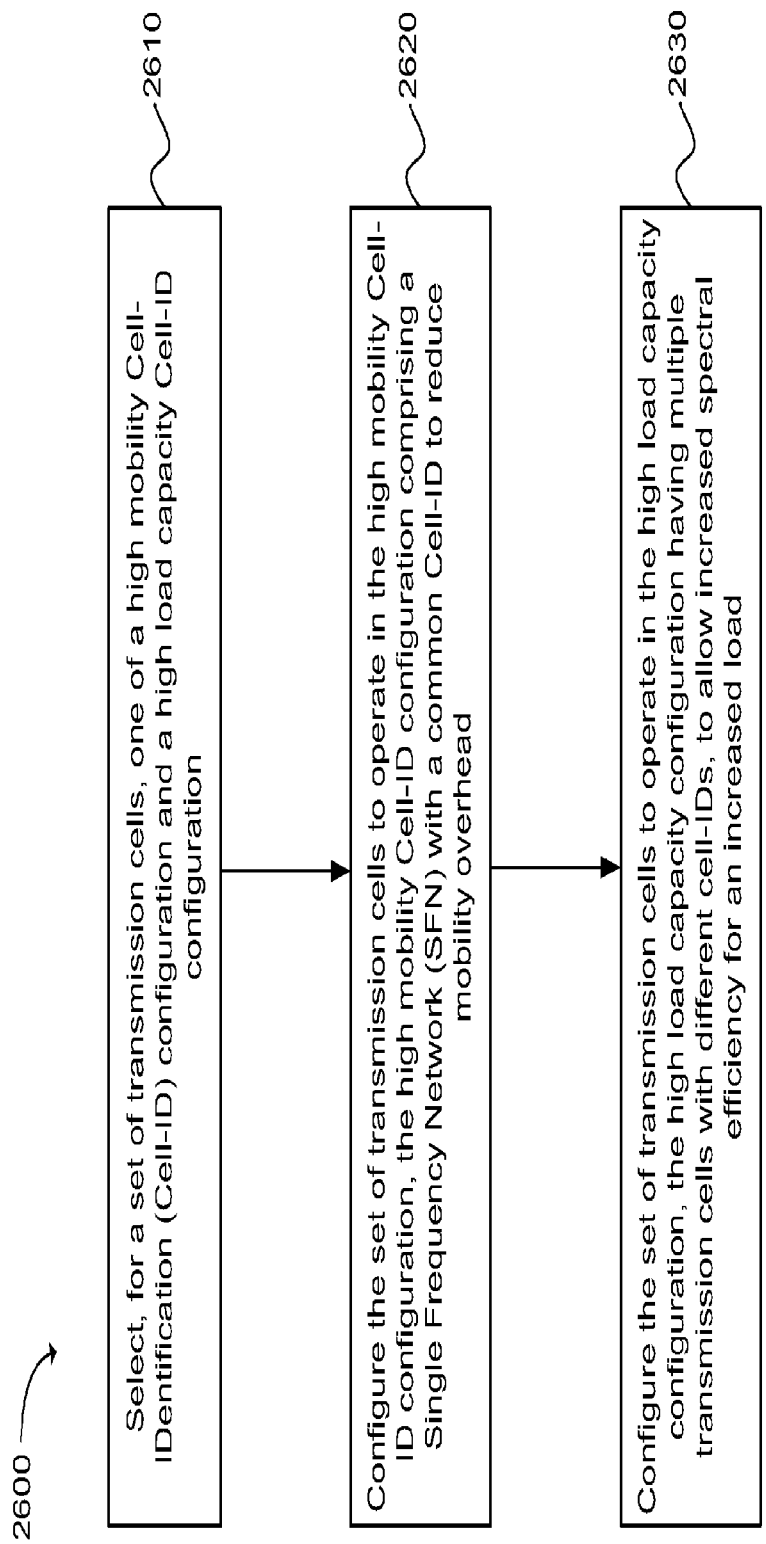
FIG. 26 depicts functionality of a device operable to balance mobility overhead and load requirements on a wireless communication system in accordance with an example.

Another example provides functionality 2600 of a device operable to balance mobility overhead and load requirements on a wireless communication system, as shown in the flowchart in FIG. 26. The device can reside on at least one of an evolved Node B (eNodeB) and an Operation & Maintenance (O&M) module located within an Evolved Packet Core (EPC). The device can include a selection module configured to select, for a set of transmission cells, one of a high mobility Cell-IDentification (Cell-ID) configuration and a high load capacity Cell-ID configuration, as in block 2610. The device can include a configuration module configured to configure the set of transmission cells to operate in the high mobility Cell-ID configuration, the high mobility Cell-ID configuration comprising a Single Frequency Network (SFN) with a common Cell-ID to reduce mobility overhead, as in block 2620. In addition, the configuration module in the device can be configured to configure the set of transmission cells to operate in the high load capacity configuration, the high load capacity configuration having multiple transmission cells with different cell-IDs, to allow increased spectral efficiency for an increased load, as in block 2630.

Figure 27:
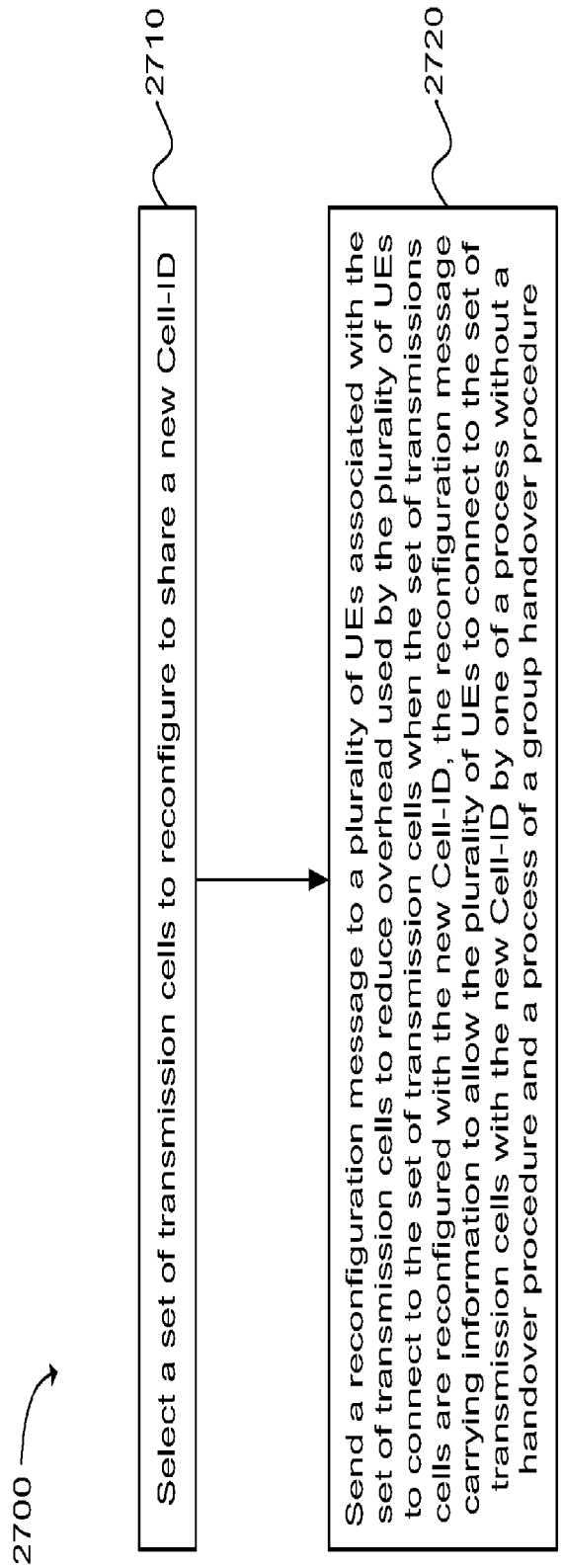
FIG. 27 depicts functionality of an evolved node B (eNB) operable to connect user equipments (UEs) to a set of transmission cells to be reconfigured with a new Cell-IDentification (Cell-ID) in accordance with an example.

Another example provides functionality 2700 of an evolved node B (eNB) operable to connect user equipments (UEs) to a set of transmission cells to be reconfigured with a new Cell-IDentification (Cell-ID), as shown in the flowchart in FIG. 27. The eNB can be configured to select a set of transmission cells to reconfigure to share a new Cell-ID, as in block 2710. In addition, the eNB can be configured to send a reconfiguration message to a plurality of UEs associated with the set of transmission cells to reduce overhead used by the plurality of UEs to connect to the set of transmission cells when the set of transmissions cells are reconfigured with the new Cell-ID, the reconfiguration message carrying information to allow the plurality of UEs to connect to the set of transmission cells with the new Cell-ID by one of a process without a handover procedure and a process of a group handover procedure, as in block 2720.

Figure 28:
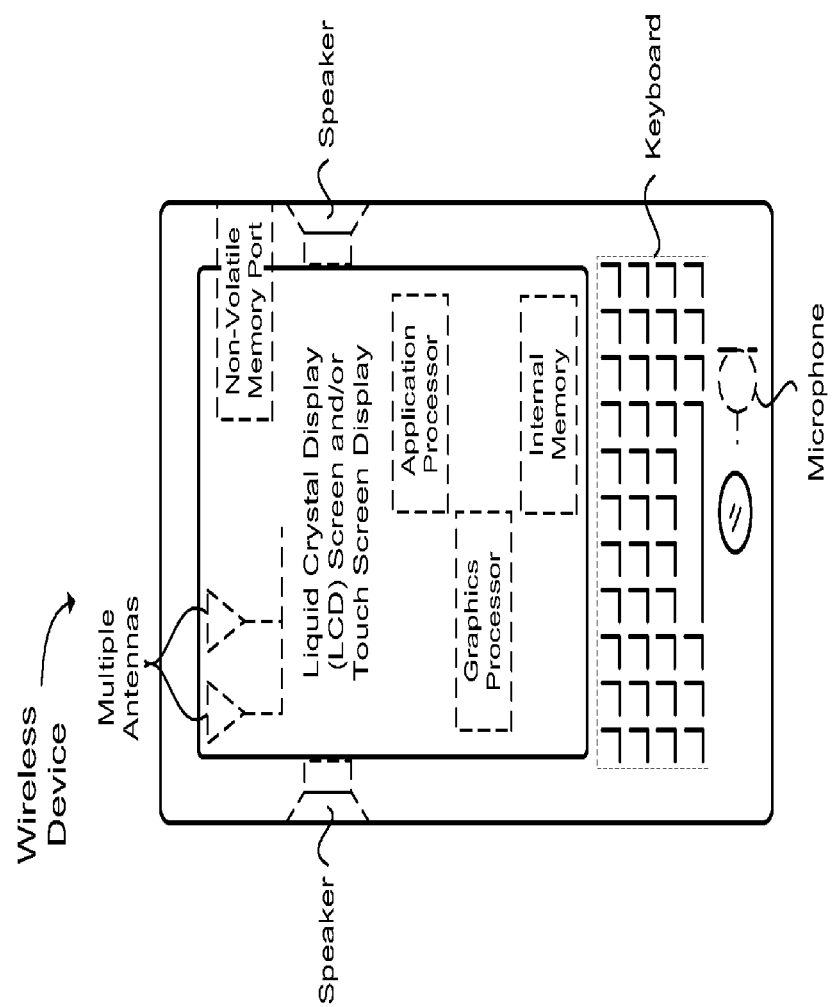
FIG. 28 is a block diagram of a UE in accordance with another example.

FIG. 28 provides an example illustration of a mobile device, such as UE, an MS, a mobile wireless mobile device, a mobile communication device, a tablet, a handset, or other type of mobile wireless mobile device. The mobile device can include one or more antennas configured to communicate with a WWAN transmission cell. While two antennas are shown, the device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a Wireless Local Area Network (WLAN), a Wireless Personal Area Network (WPAN), and/or a WWAN.

FIG. 28 also provides an illustration of a microphone and one or more speakers that can be used for audio input and output from the mobile device. The display screen may be a Liquid Crystal Display (LCD) screen, or other type of display screen such as an Organic Light Emitting Diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. Non-volatile memory can include a Solid State Drive (SSD), Flash Random Access Memory (RAM), and so forth. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may be implemented in programmable hardware such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, Solid State Drives (SSD), flash RAM, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium (including volatile and non-volatile memory and/or storage elements), at least one input device, and at least one output device. One or more programs that may implement/utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member based on their presentation in a common group without contrary indications. In addition, various examples of the present invention may be referred to herein along with alternatives for the various components thereof. It is understood that such examples, examples, and alternatives are not to be construed as de facto equivalents of one another, but are to be considered as separate and autonomous representations of the present invention.

Furthermore, the described features, structures, or characteristics may be combined in any suitable manner in one or more examples. In the following description, numerous specific details are provided, such as examples of materials, fasteners, sizes, lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown/described in detail to avoid obscuring aspects of the invention.

While the forgoing examples are illustrative of the principles of the present invention, it will be apparent to those of ordinary skill in the art that many modifications in form, usage and details of implementation can be made without the exercise of inventive faculty, and without departing from the principles/concepts of the invention. Accordingly, it is not intended that the invention be limited, except as by the claims.

What is claimed is:

1. A device for balancing mobility overhead and load requirements on a wireless communication system, residing on at least one of an evolved Node B (eNodeB) or an Operation & Maintenance (O&M) module located within an Evolved Packet Core (EPC), said device comprising:
   a selection module configured to select, for a set of transmission cells, one of a high mobility Cell-IDentification (Cell-ID) configuration and a high load capacity Cell-ID configuration, wherein the selection module is comprised of code that is stored in one or more digital memory devices to be executed by one or more processors or the selection module is implemented in a first hardware circuit; and
   a configuration module, in communication with the selection module, wherein the configuration module is comprised of code that is stored in the one or more digital memory devices to be executed by the one or more processors or the configuration module is implemented in a second hardware circuit, and wherein the configuration module is configured to:
      configure the set of transmission cells to operate in the high mobility Cell-ID configuration, the high mobility Cell-ID configuration comprising a Single Frequency Network (SFN) with a common Cell-ID to reduce mobility overhead, and
      configure the set of transmission cells to operate in the high load capacity configuration, the high load capacity configuration having multiple transmission cells with different cell-IDs, to allow increased spectral efficiency for an increased load.

2. The device of claim 1, further comprising a speed measurement module, wherein the speed measurement module is comprised of code that is stored in the one or more digital memory devices to be executed by the one or more processors or the speed measurement module is implemented in a third hardware circuit, and wherein the speed measurement module is in communication with the selection module, the speed measurement module configured to:
   perform at least one speed measurement for a set of User Equipments (UEs) within the selected coverage area for the set of transmission cells; and
   communicate the at least one speed measurement to the selection module.

3. The device of claim 2, wherein the selection module uses at least one of the at least one speed measurement and load information to select, for the set of transmission cells, one of the high mobility Cell-ID configuration and the high load capacity Cell-ID configuration.

4. The device of claim 3, wherein the selection module selects, for the set of transmission cells, one of the high mobility Cell-ID configuration and the high load capacity Cell-ID configuration based on a combined value relative to a configuration threshold wherein:
   the combined value includes weighted speed values and weighted load values;
   higher weighted speed values push the combined value toward values relative to the configuration threshold indicative of the high mobility Cell-ID configuration; and
   higher weighted load values push the combined value toward values relative to the configuration threshold indicative of the high load capacity Cell-ID configuration.

5. The device of claim 1, wherein a selected coverage area for the set of transmission cells spans a length of a thoroughfare designated for at least one of vehicular traffic and railway traffic.

6. The device of claim 1, wherein the selection module uses at least one of time of day information, day of week information, holiday information, and event information to select one of the high mobility Cell-ID configuration and the high load capacity Cell-ID configuration.

7. The device of claim 1, further comprising a formation module, wherein the formation module is comprised of code that is stored in the one or more digital memory devices to be executed by the one or more processors or the formation module is implemented in a third hardware circuit, and wherein the formation module is configured to:
receive at least one of load information and at least one speed measurement from multiple transmission cells; and
compile the set of transmission cells by including a given transmission cell in the set of transmission cells where the given transmission cell is adjacent to a transmission cell already included in the set of transmission cells and at least one of load information and the at least one speed measurement has a corresponding set of values within a value range predefined for the set of transmission cells.

8. The device of claim 1, further comprising a measurement module, wherein the measurement module is comprised of code that is stored in the one or more digital memory devices to be executed by the one or more processors or the measurement module is implemented in a third hardware circuit, and wherein the measurement module is configured to:
send a set of Channel State Information-Reference Signals (CSI-RSs) for yet-to-be-configured Cell-IDs to a plurality of User Equipments (UE) within a selected coverage area of the set of transmission cells; and
receive a set of measurements from the plurality of UEs based on the set of CSI-RSs, the set of measurements to be used to assist in handover of the plurality of UEs where the selection module changes a selection from a high mobility Cell-ID configuration to a high load capacity Cell-ID configuration.

9. At least one non-transitory machine readable storage medium storing instructions which when executed by a processor perform the following:
receiving, at an evolved Node B (eNodeB) in a Packet Core Network, load information for a set of transmission cells within a selected coverage area;
selecting a reduced set of transmission cells in a Radio Access Network (RAN) operable to provide coverage to the selected coverage area based on the load information; and
reconfiguring the reduced set of transmission cells in the RAN into a Single Frequency Network (SFN) with a common Cell IDentification (Cell-ID) to extend a coverage area of the reduced set of transmission cells to cover the selected coverage area with fewer transmission cells.

10. The at least one non-transitory machine readable storage medium of claim 9, further comprising instructions which when executed by the processor perform the following:
sending a Channel State Information-Reference Signal (CSI-RS) for a yet-to-be-configured common Cell-ID to a plurality of User Equipments (UEs) within the selected coverage area;
receiving a set of measurements from the plurality of UEs based on the CSI-RS; and
using the set of measurements to select the reduced set of transmission cells and to determine that the reduced set of transmission cells will maintain coverage for the selected coverage area after being configured with the common Cell-ID.

11. The at least one non-transitory machine readable storage medium of claim 9, further comprising instructions which when executed by the processor perform the following: first compiling the set of transmission cells by including adjacent transmission cells with a light traffic load in the set of transmission cells.

12. The at least one non-transitory machine readable storage medium of claim 9, wherein the load information is acquired from one of at least one of an S1 transport network layer load and at least one Relative Narrowband Transmission Power (RNTP) message, the RNTP message communicated via an X2 connection between transmission cells.

13. The at least one non-transitory machine readable storage medium of claim 9, further comprising instructions which when executed by the processor perform the following:
adjusting antenna tilting to optimize coverage for a resultant coverage scenario arising after reconfiguring the remaining set of transmission cells into the SFN with the common Cell-ID.

14. The at least one non-transitory machine readable storage medium of claim 9, further comprising instructions which when executed by the processor perform the following:
determining, based on the load information, that at least one additional transmission cell would improve handling of an increased traffic load within the selected coverage area by increasing spectral efficiency for the increased traffic load;
reconfiguring the at least one additional transmission cell with at least one new Cell-ID;
performing a reassignment for at least one UE to the at least one additional transmission cell.

15. The at least one non-transitory machine readable storage medium of claim 14, further comprising instructions which when executed by the processor perform the following:
requesting at least one CSI-RS based measurement to determine the at least one additional transmission cell, where a CSI-RS for the at least one CSI-RS based measurement carries information that can be correlated to a yet-to-be configured Cell-ID; and
requesting at least one CSI-RS based measurement after the at least one additional transmission cell has been reconfigured with at least one new Cell-ID to provide channel information for the at least one new Cell-ID.

16. A method for implementing Channel State Information-Reference Signals (CSI-RSs) for yet-to-be-configured Cell-IDentifications (Cell-IDs), said method comprising:
providing, to a set of User Equipments (UEs), identification information for a CSI-RS for a yet-to-be-configured Cell-ID to be shared by a set of transmission cells, using one or more processors of an evolved node B (eNodeB);
embedding the CSI-RS with the identification information to allow a measurement of the CSI-RS by at least one UE from the set of UEs to be identified with the yet-to-be-configured Cell-ID and the set of transmission cells, using the one or more processors of the eNodeB; and
performing a reconfiguration action on the set of transmission cells based on the measurement, using the one or more processors of the eNodeB.

17. The method of claim 16, wherein performing the reconfiguration action further comprises:
receiving measurements from the set of UEs; and
estimating a potential coverage area, based on the set of measurements, for a potential new Single Frequency Network (SFN) with a common Cell-ID, where at least a subset of the set of transmission cells has been designated for the potential new SFN.

18. The method of claim 16, wherein performing the reconfiguration action further comprises:
receiving measurements from the set of UEs; and
determining, based on the measurements, at least one target transmission cell within the set of transmission cells for at least one new Cell-ID.

19. The method of claim 16, wherein embedding the CSI-RS with the identification information further comprises:
assigning an identification value to the yet-to-be-configured Cell-ID; and
replacing a Cell-ID value with the identification value to generate a pseudo random sequence for the CSI-RS that can identify the yet-to-be-configured Cell-ID.

20. The method of claim 16, wherein the identification information is embedded in an initializing portion of the CSI-RS.

21. The method of claim 16, wherein providing a set of UEs with identification information further comprises broadcasting the identification information via Remote Radio Control (RRC) broadcasting to a geographic area covered by the yet-to-be-configured Cell-ID.

22. An evolved Node B (eNodeB) operable to connect User Equipments (UEs) to a set of transmission cells to be reconfigured with a new Cell-IDentification (Cell-ID), said eNodeB comprising:
first circuitry configured to select a set of transmission cells to reconfigure to share a new Cell-ID; and
second circuitry configured to send a reconfiguration message to a plurality of UEs associated with the set of transmission cells to reduce overhead used by the plurality of UEs to connect to the set of transmission cells when the set of transmissions cells are reconfigured with the new Cell-ID, the reconfiguration message carrying information to allow the plurality of UEs to connect to the set of transmission cells with the new Cell-ID by one of a process without a handover procedure and a process of a group handover procedure.

23. The eNodeB of claim 22, wherein the reconfiguration message comprises:
an indication for the plurality of UEs to stop transmission;
a value of the new Cell-ID; and
a corresponding time when the new Cell-ID will be operational,
to enable the plurality of UEs receiving the reconfiguration message to stop receiving and transmitting data until a time when the new Cell-ID is operational and it is possible for the plurality of UEs to reconnect to the set of transmission cells with the new Cell-ID.

24. The eNodeB of claim 22, wherein the reconfiguration message comprises a common handover command message sent to the plurality of UEs via multicast signaling, the common handover command providing parameters that are used to perform a handover for the plurality of UEs to the reconfigured set of transmission cells with the new Cell-ID.

25. The eNodeB of claim 24, wherein the second circuitry is further configured to send a different handover command to specify a handover delay for the plurality of UEs associated with the set of transmission cells.

26. The eNodeB of claim 24, wherein the same handover command message comprises at least one Cell-Radio Network Temporary Identifier (C-RNTI) and at least one target transmission cell security algorithm identifier.

27. The eNodeB of claim 24, wherein the common handover command message comprises at least one of a dedicated Radio Access CHannel (RACH) and target eNodeB system information.

28. The eNodeB of claim 22, wherein the second circuitry is further configured to provide a notification message to at least one neighbor transmission cell adjacent to a reconfigured transmission cell within the set of transmission cells, the notification message comprising:
an original Cell-ID;
a reconfigured Cell-ID; and
information about when the reconfigured Cell-ID will be operable for the reconfigured transmission cell.

29. The eNodeB of claim 22, wherein the reconfiguration message indicates a time when the common Cell-ID will be operational is in a next System Information Block (SIB) modification period.

* * * * *